US010981093B2

(12) United States Patent
Shotey et al.

(10) Patent No.: US 10,981,093 B2
(45) Date of Patent: *Apr. 20, 2021

(54) WATER CONTAINER WITH FLOATABLE FILTER SYSTEM AND METHOD

(71) Applicant: Plenty Company, LLC, Scottsdale, AZ (US)

(72) Inventors: Marcus J. Shotey, Scottsdale, AZ (US); Jason Swanson, Fountain Hills, AZ (US); David M. Daniel, Phoenix, AZ (US); Daniel Reed, Mesa, AZ (US)

(73) Assignee: Plenty Company, LLC, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/941,241

(22) Filed: Jul. 28, 2020

(65) Prior Publication Data
US 2020/0353388 A1 Nov. 12, 2020

Related U.S. Application Data

(63) Continuation of application No. 16/182,531, filed on Nov. 6, 2018, now Pat. No. 10,722,828, which is a (Continued)

(51) Int. Cl.
*B01D 35/05* (2006.01)
*C02F 1/00* (2006.01)
(Continued)

(52) U.S. Cl.
CPC ......... *B01D 35/05* (2013.01); *B01D 33/0108* (2013.01); *B01D 33/74* (2013.01);
(Continued)

(58) Field of Classification Search
CPC .... A47J 31/005; A47J 31/20; A61M 5/31513; B01D 2313/20; B01D 29/0072;
(Continued)

(56) References Cited

U.S. PATENT DOCUMENTS 310,204 A 1/1885 Jenks
3,319,577 A 2/1965 Francis
(Continued)

FOREIGN PATENT DOCUMENTS

CN 104665434 6/2015
CN 104860368 8/2015
(Continued)

*Primary Examiner* — Bobby Ramdhanie
*Assistant Examiner* — Donovan Bui-Huynh
(74) *Attorney, Agent, or Firm* — Booth Udall Fuller, PLC

(57) ABSTRACT

A portable drinking water filter system, such as a pitcher, having a sleeve and a floatable body including a filter opening configured to receive a water filter, the floatable body having a seal extending outward from an outer surface of the floatable body. The floatable body is disposed in a sleeve cavity such that a body seal engages the sidewall and restricts water from passing between the floatable body and the sidewall. The seal is configured to create friction with the sidewall, wherein the friction created when the floatable body rises in the sleeve is different than when the floatable body lowers in the sleeve. The friction created when the floatable body rises in the sleeve is greater than when the floatable body lowers in the sleeve, allowing the floatable body to auto-retract toward a cavity base without burping.

20 Claims, 19 Drawing Sheets

Related U.S. Application Data continuation-in-part of application No. 15/598,234, filed on May 17, 2017, now Pat. No. 10,118,113, which is a continuation-in-part of application No. 15/348,888, filed on Nov. 10, 2016, now Pat. No. 9,796,600, which is a continuation-in-part of application No. 14/302,205, filed on Jun. 11, 2014, now abandoned.

(60) Provisional application No. 62/474,532, filed on Mar. 21, 2017, provisional application No. 62/375,863, filed on Aug. 16, 2016, provisional application No. 61/976,276, filed on Apr. 7, 2014, provisional application No. 61/920,021, filed on Dec. 23, 2013.

(51) Int. Cl.
*B01D 33/01* (2006.01)
*B01D 33/74* (2006.01)
*A47J 31/60* (2006.01)
*B01D 24/00* (2006.01)

(52) U.S. Cl.
CPC ............ *C02F 1/003* (2013.01); *A47J 31/605* (2013.01); *B01D 23/00* (2013.01); *B01D 2201/304* (2013.01); *C02F 2201/004* (2013.01); *C02F 2307/04* (2013.01); *Y02A 20/208* (2018.01)

(58) Field of Classification Search
CPC .... B01D 33/01; B01D 33/0116; B01D 33/42; B01L 2300/0681; B01L 2400/0478; C02F 1/002; C02F 1/003; C02F 1/28; C02F 1/70; C02F 2303/185; C02F 2307/04
See application file for complete search history.

(56) References Cited

U.S. PATENT DOCUMENTS

| | | |
|---|---|---|
| 4,151,092 A | 4/1979 | Grimm et al. |
| 5,919,365 A | 7/1999 | Collette |
| 6,074,550 A | 6/2000 | Hofmann et al. |
| 6,387,260 B1 | 5/2002 | Pimenov |
| 6,524,477 B1 | 2/2003 | Hughes |
| 6,602,406 B1 | 8/2003 | Nohren |
| 7,323,104 B2 | 1/2008 | Wennerström |
| 7,767,087 B2 | 8/2010 | Wilson |
| 7,790,117 B2 | 9/2010 | Ellis et al. |
| 7,807,052 B2 | 10/2010 | Milne |
| 7,955,501 B2 | 6/2011 | Wilson |
| 8,216,462 B2 | 7/2012 | o'Brien et al. |
| 8,313,644 B2 | 11/2012 | Harris et al. |
| 2006/0151381 A1 | 7/2006 | Wennerstrom |
| 2007/0284300 A1 | 12/2007 | Bidlingmeyer et al. |
| 2010/0065488 A1 | 3/2010 | Milne |
| 2010/0320135 A1 | 12/2010 | Sun |
| 2014/0008311 A1 | 1/2014 | Weston et al. |

FOREIGN PATENT DOCUMENTS

| | | |
|---|---|---|
| DE | 1298882 | 7/1969 |
| DE | 19603884 | 3/1997 |
| FR | 3018459 | 9/2015 |
| GB | 2197647 | 5/1988 |
| RU | 2125974 | 2/1999 |
| WO | 2000057985 | 10/2000 |
| WO | 200509215 | 10/2005 |

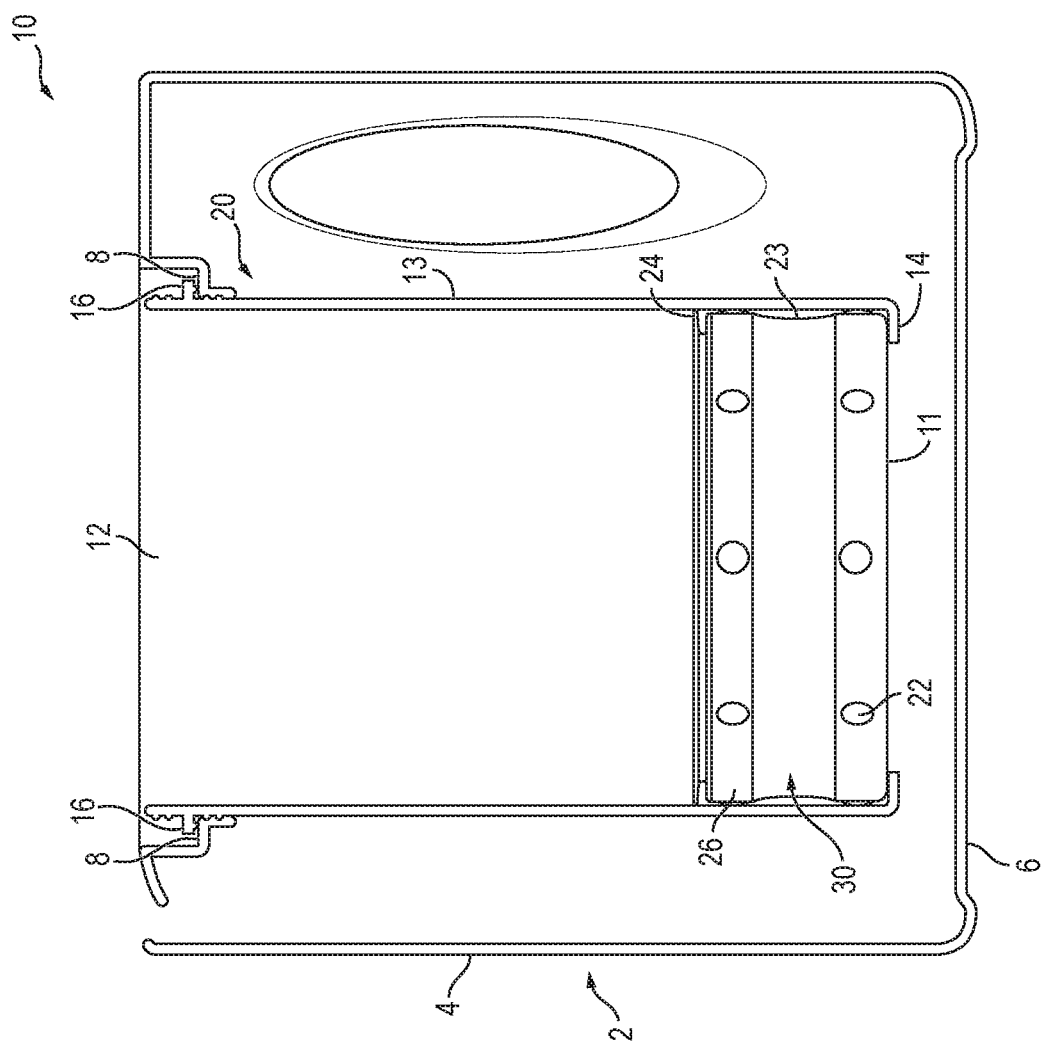

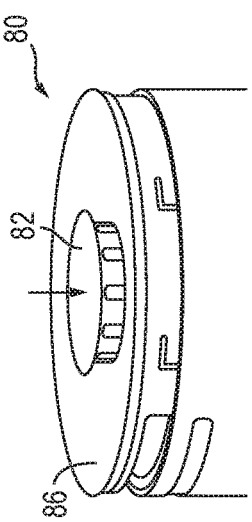
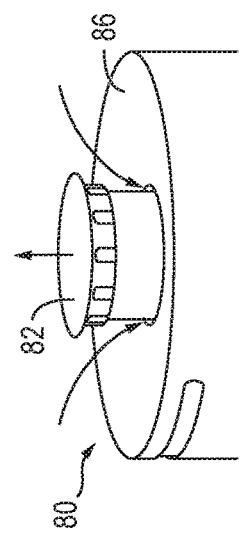
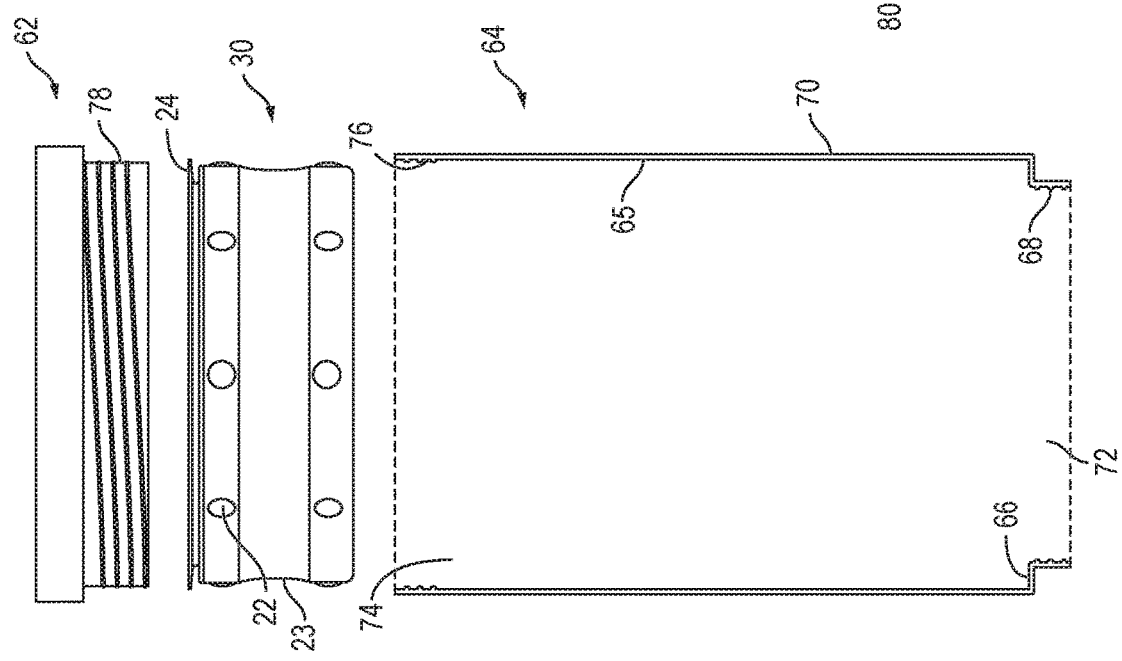

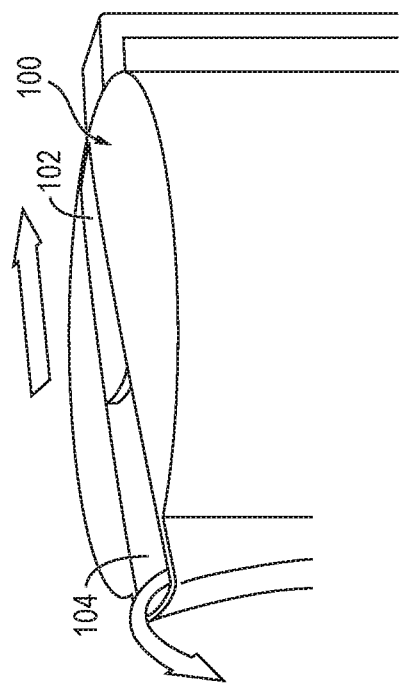
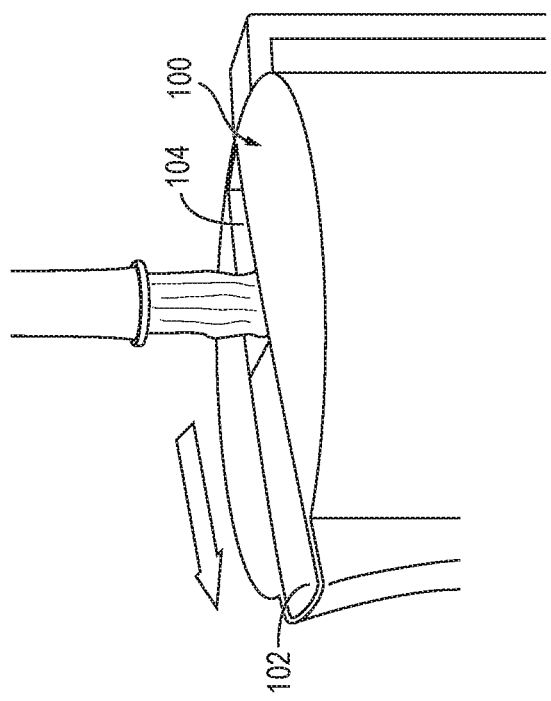

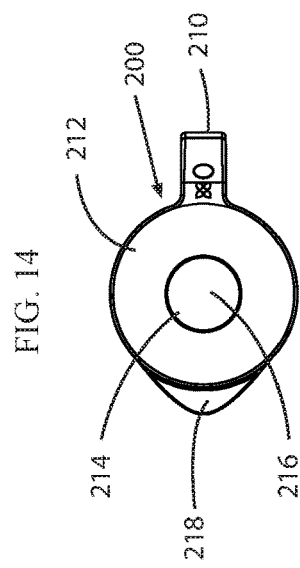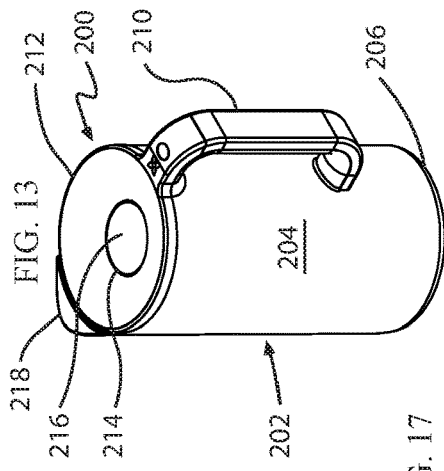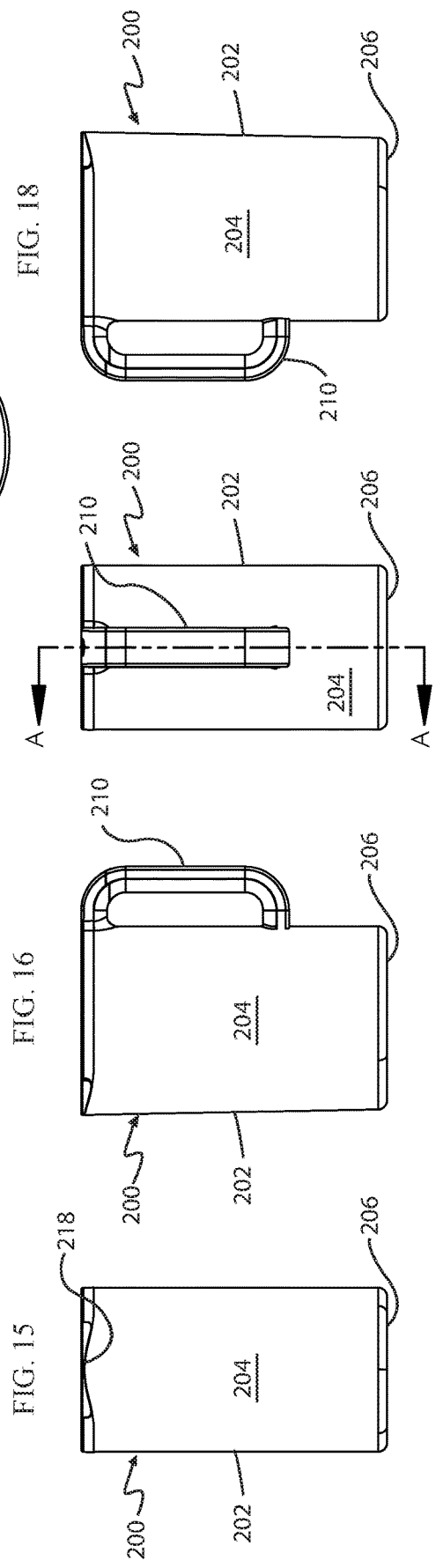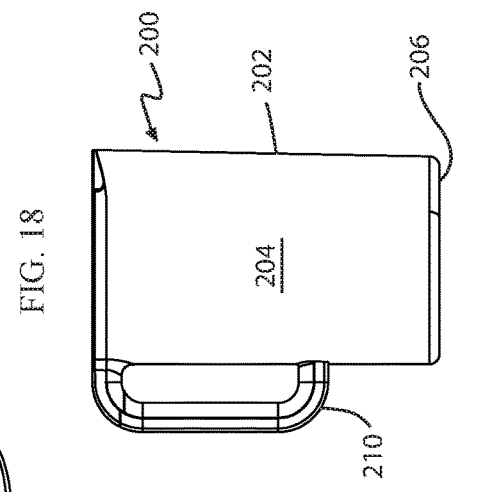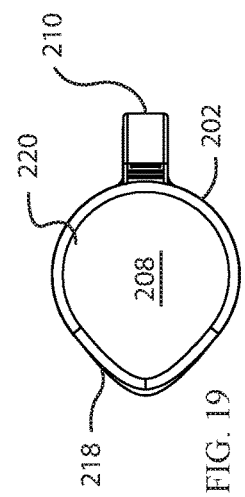

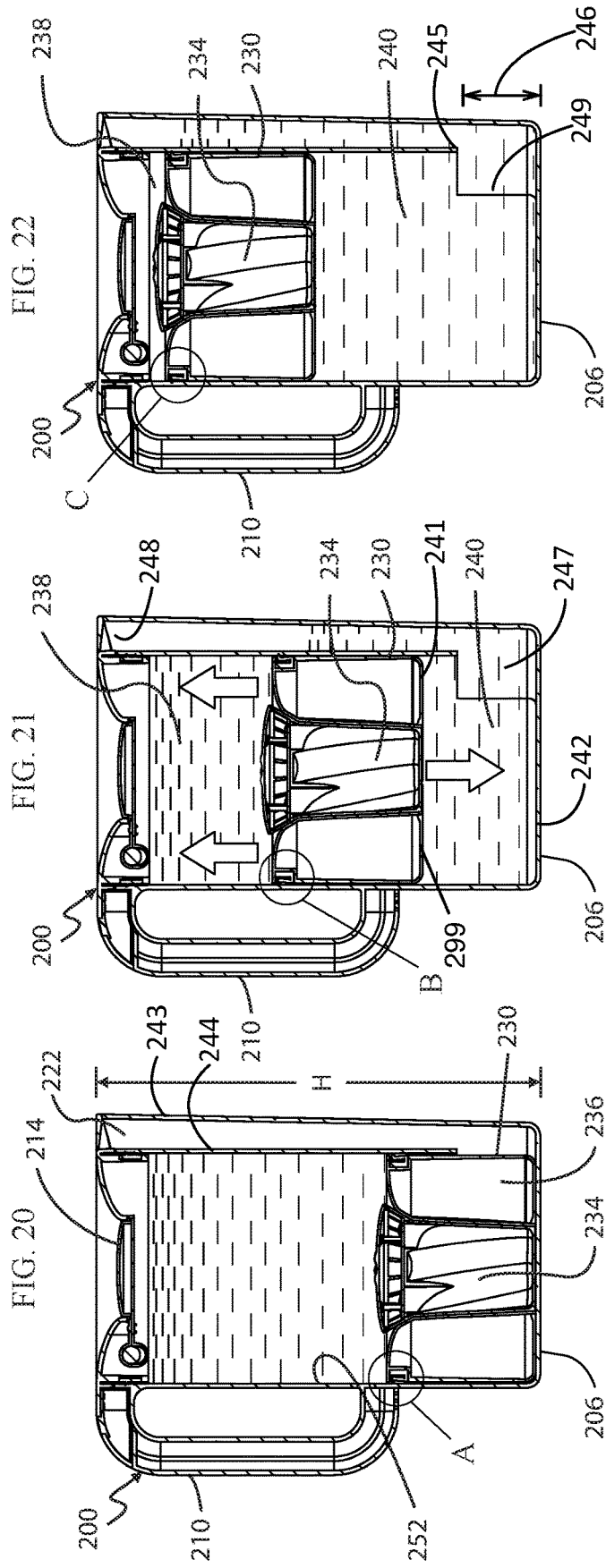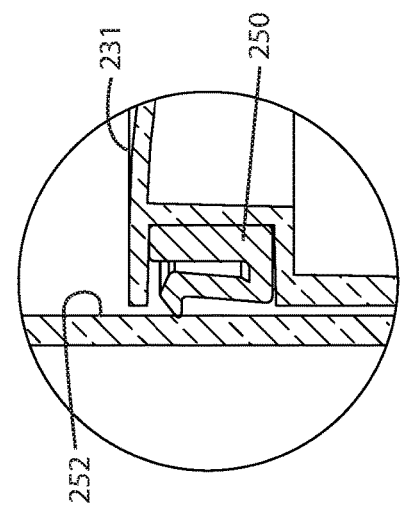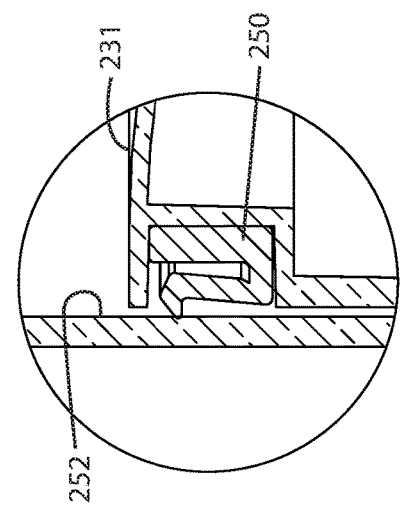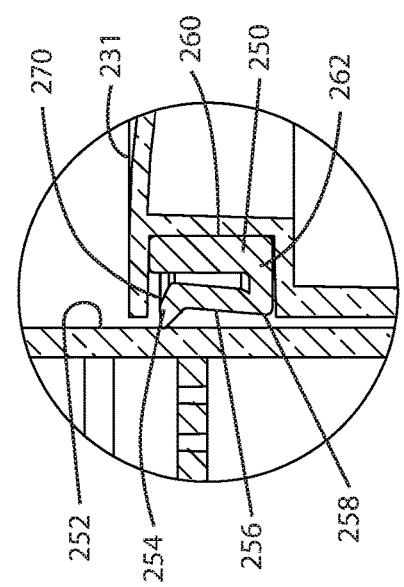

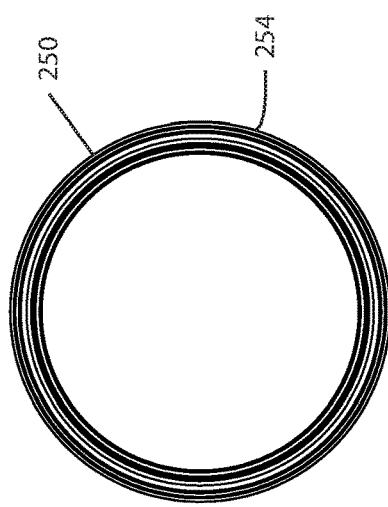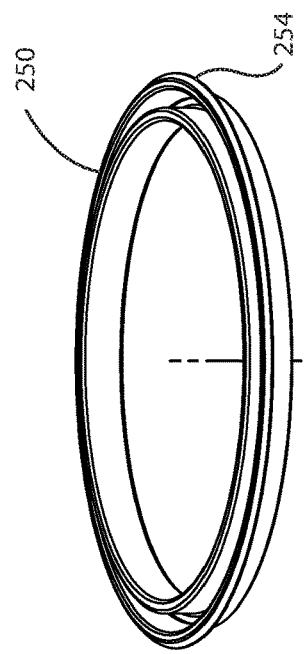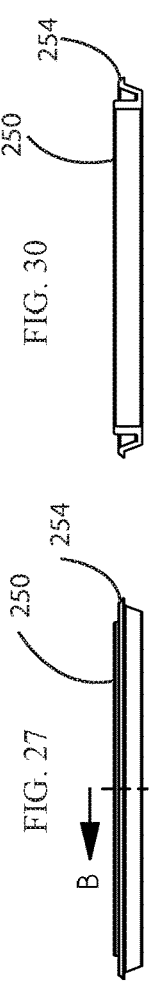

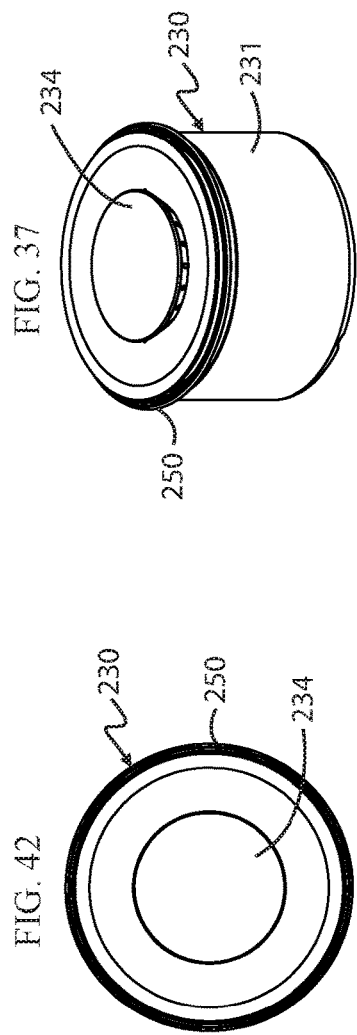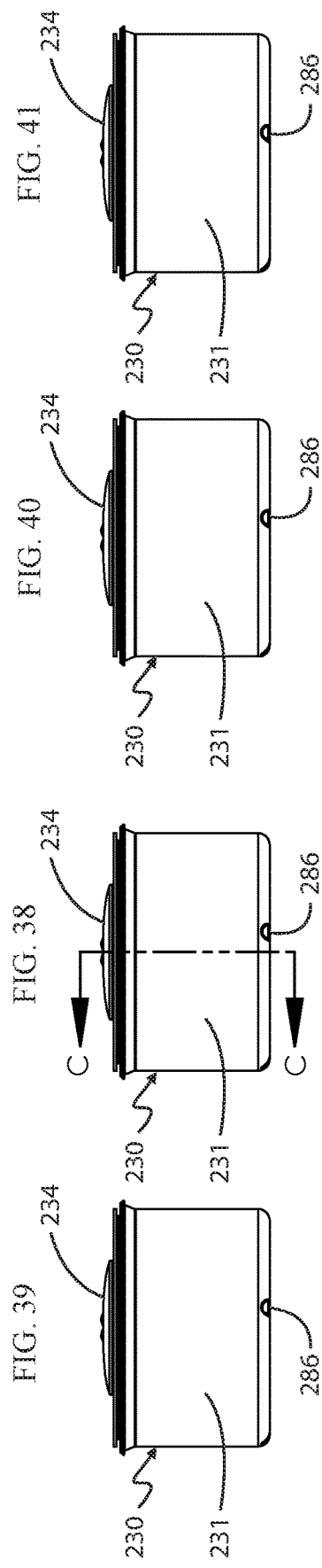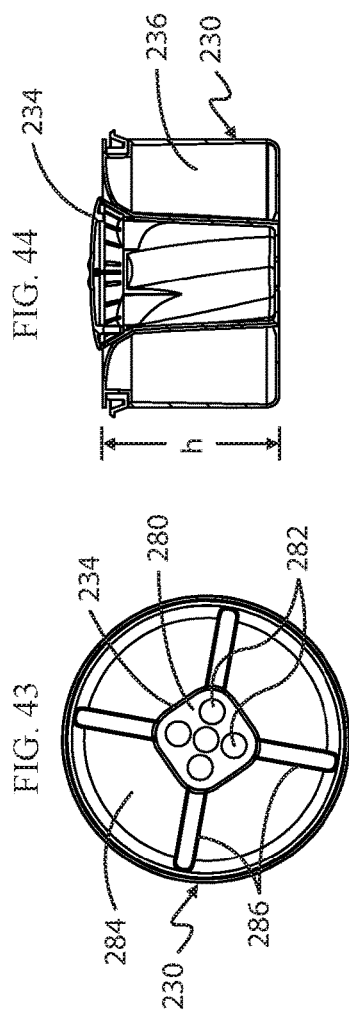

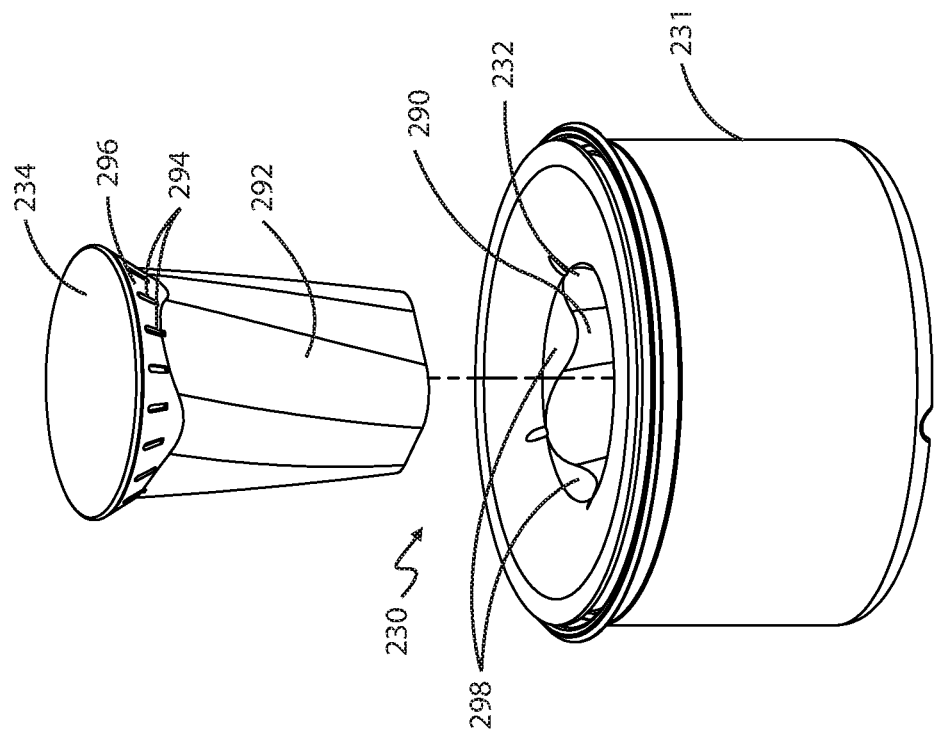
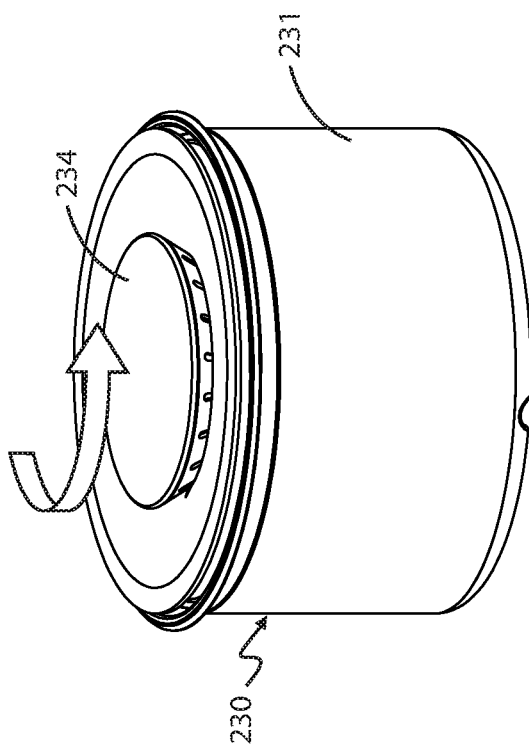

WATER CONTAINER WITH FLOATABLE FILTER SYSTEM AND METHOD

CROSS REFERENCE TO RELATED APPLICATIONS

This application is a continuation of U.S. patent application Ser. No. 16/182,531, entitled "WATER CONTAINER WITH FLOATABLE FILTER SYSTEM AND METHOD" to Shotey et al., which was filed Nov. 6, 2018, and issued as U.S. patent Ser. No. 10/722,828 on Jul. 28, 2020, which application is a continuation of U.S. patent application Ser. No. 15/598,234, entitled "WATER CONTAINER WITH FLOATABLE FILTER SYSTEM AND METHOD" to Shotey et al., which was filed May 17, 2017, and issued as U.S. patent Ser. No. 10/118,113 on Nov. 6, 2018, which application is a continuation-in part of U.S. patent application Ser. No. 15/348,888, entitled "WATER CONTAINER WITH FLOATABLE FILTER" to Shotey et al., which was filed Nov. 10, 2016, and issued as U.S. Pat. No. 9,796,600 on Oct. 24, 2017, which application is a continuation-in-part of U.S. patent application Ser. No. 14/302,205, entitled "WATER FILTER SYSTEMS AND METHODS OF USE" to Shotey et al., which was filed on Jun. 11, 2014, now abandoned, which document claims the benefit of the filing date of U.S. Provisional Patent Application 61/920,021, entitled "WATER FILTER SYSTEMS AND METHODS OF USE" to Shotey et al., which was filed on Dec. 23, 2013, the contents of which is hereby incorporated herein by reference, and also claims the benefit of the filing date of U.S. Provisional Patent Application 61/976,276, entitled "WATER FILTER SYSTEMS AND METHODS OF USE" to Shotey et al., which was filed on Apr. 7, 2014, the contents of each of which are hereby incorporated herein by reference. U.S. patent application Ser. No. 15/598,234 also claims benefit of U.S. Provisional Patent application 62/375,863, entitled "WATER FILTER SYSTEMS AND METHODS OF USE" to Shotey et al., which was filed Aug. 16, 2016, the disclosure of which is hereby incorporated herein by reference. U.S. patent application Ser. No. 15/598,234 also claims benefit of U.S. Provisional Patent application 62/474,532, entitled "WATER FILTER SYSTEMS AND METHODS OF USE" to Shotey et al., which was filed Mar. 21, 2017, the disclosure of which is hereby incorporated herein by reference.

TECHNICAL FIELD

The present disclosure is generally related to the field of water filtration containers, including water pitchers, having filters configured to provide filtered water.

BACKGROUND

Pitchers with an attachable water filter are frequently used by consumers who wish to filter tap water before drinking or use. Typical filters couple to a reservoir that fixedly sits within the water pitcher. These reservoirs, however, are usually relatively small compared to the amount of space available within the pitcher for carrying purified water. If, however, the reservoir is enlarged to increase the unfiltered water capacity of the reservoir, the size of the filtered water space decreases. Thus, conventional water filtration pitchers require multiple fills of the reservoir to fill the volume of the filtered water reservoir, which is very time consuming, frustrating, and can take up to 15 minutes or more.

Frustration over the long wait time for fully filling a water pitcher, the small filtered water reservoir compared to the pitcher size, and the requirement to fill the unfiltered water reservoir multiple times to get a fully filled filtered water reservoir has existed since the first self-filtering water pitchers with the unfiltered water reservoirs were launched by Brita in the 1960s. Companies such as Brita, Pur and Camelback have all attempted to solve these problems in different ways, but each commercially viable attempt still suffers from one or more of the problems of requiring multiple fills, reduced filtering of contaminants, and slower fill or dispensing of water because the filtering is being done while filling or dispensing. Despite the inherent problems with the original Brita design with its small unfiltered water reservoir that requires multiple fills to filter water to the larger filtered water reservoir, that Brita pitcher design still remains the top selling self-filtering water pitcher in the world.

SUMMARY

According to one aspect, a portable drinking water pitcher may comprise a floatable body surrounding a filter opening adapted to receive and engage a replaceable water filter therein, the floatable body having a seal extending outward of an outer surface of the floatable body, a pitcher having an upper end and a base opposite the upper end, the base and the upper end joined by an outer wall, the pitcher defining a first cavity, a removable sleeve positioned within the pitcher and extending from the upper end to proximate the base of the pitcher, the sleeve defining a second cavity within the pitcher and comprising one or more sidewalls continuously surrounding the second cavity, the sleeve having a top open end and a bottom open end, and a spout formed by the one or more sidewalls of the removable sleeve and the outer wall of the pitcher, the spout extending from adjacent the base of the pitcher to adjacent the upper end of the pitcher, the spout defining an exit opening located adjacent the upper end and an inlet opening located adjacent the base, wherein the inlet opening of the spout is in fluid communication with the bottom end of the sleeve and receives water from the second cavity of the sleeve, wherein the floatable body is disposed in the cavity with the seal engaging the one or more sidewalls to restrict water from passing between the floatable body and the one or more sidewalls as the floatable body moves from a raised position adjacent the top end of the sleeve to a lowered position adjacent the bottom open end of the sleeve, and wherein as water is dispensed through the spout, the floatable body auto-retracts towards the base while maintaining the engagement of the seal with the one or more sidewalls and an orientation of the floatable body in relation to the base as the pitcher is tipped to pour water from the spout.

Particular embodiments may comprise one or more of the following features. The auto-retraction of the floatable body may occur in reaction to a pressure differential created between air above the floatable body in the cavity and water below the floatable body in the second cavity. The auto-retraction of the floatable body may be in a direction away from the exit opening of the spout. The base of the pitcher may be located above the exit opening of the spout at the upper opening when the floatable body auto-retracts away from the upper opening towards the base when the pitcher is tipped to pour water from the spout. The seal of the floatable body may be located above the bottom end of the sleeve after the floatable body has been auto-retracted to the base. The floatable body may have a planar bottom surface and the sleeve may have a planar bottom surface, the planar surfaces located parallel to one another and remain parallel as the floatable body auto-retracts towards the base when the pitcher is tipped to pour water from the spout. The floatable body may fill a portion of the bottom open end as the floatable body auto-retracts towards the base. The top open end of the sleeve may be proximate the upper end of the pitcher and the bottom open end of the sleeve is in contact with the base. The second cavity may fill a majority of the first cavity. The first cavity having a first volume and the second cavity having a second volume, wherein the second volume may fill at least 70% of the first volume. The second volume fills at least 85% of the first volume. One of the bottom open end of the sleeve and the pitcher base may comprise a protrusion, and the other of the bottom open end of the sleeve and the pitcher base may be mated with the protrusion. The pitcher may engage the sleeve proximate at least one of the top open end and the bottom open end of the sleeve. A removable lid may be coupled to the upper end of the pitcher and the top open end of the sleeve. The floatable body having a volume within the floatable body and the second cavity having a volume within the second cavity, wherein the ratio of the floatable body volume to the second cavity volume may be within the range of ⅛ to ½. The seal may have a first portion configured to engage the floatable body and a second portion extending outwardly and configured to engage the one or more sleeve sidewalls and restrict water from passing between the floatable body and the one or more sleeve sidewalls. The second portion may comprise an arm, a distal tapered tip coupled to the arm, and a bridge coupled to the arm through a hinge portion opposite the tapered tip and also coupled to the first portion opposite the hinge portion. The hinge portion may be configured to allow the second portion to bend about the hinge portion such that the tapered tip engages the one or more sleeve sidewalls at a second angle relative to the floatable body when the floatable body rises, and a first angle when the floatable body lowers. The tapered tip may be configured to create friction with the one or more sleeve sidewalls, wherein the friction created when the floatable body rises in the sleeve is different from the friction created when the floatable body lowers in the sleeve.

According to another aspect, a portable drinking water pitcher may comprise a floatable body surrounding a filter opening adapted to receive and engage a replaceable water filter therein, the floatable body having a seal extending outward of an outer surface of the floatable body, and a pitcher having an upper end, a sidewall defining a cavity, a lid and a base opposite the upper end, the pitcher further having an inner wall and an outer wall defining a channel, the channel including an exit opening located adjacent the upper end and an inlet opening located adjacent the base, wherein the floatable body is disposed in the cavity with the seal engaging the sidewall of the cavity to restrict water from passing between the sidewall and the floatable body as the floatable body moves between a first position and a second position, and wherein as water is dispensed through the exit opening of the channel, the floatable body auto-retracts away from the lid towards the base while maintaining the engagement of the seal with the sidewall and an orientation of the floatable body in relation to the base as the pitcher is tipped to pour water from the channel.

Particular embodiments may comprise one or more of the following features. The auto-retraction of the floatable body may be in a direction away from the exit opening of the channel. The base of the pitcher may be located above the exit opening of the channel when the floatable body auto-retracts away from the lid towards the base when the pitcher is tipped to pour water from the channel. The inner wall may have a terminal end that is spaced a distance from the base and define a passageway in fluid communication with the inlet opening of the channel, the floatable body may reduce the size of the passageway as the floatable body auto-retracts towards the base. The seal of the floatable body may be located above the terminal end after the floatable body has been retracted to the base. The floatable body has a planar bottom surface and the base has a planar bottom surface, the planar surfaces may be located parallel to one another and remaining parallel as the floatable body auto-retracts toward the base when the pitcher is tipped to pour water from the channel. The floatable body may further comprise at least one contact point on a surface of the floatable body that is vertically spaced from the seal by more than half a distance between a top surface of the floatable seal and a bottom surface of the floatable seal.

According to another aspect, a method of filtering water may comprise disposing a removable sleeve in a first cavity of a container, the container having a handle, an upper end, a pour lip, one or more pitcher sidewalls, and a pitcher base opposite the upper end together defining the first cavity, and the removable sleeve having an upper opening, one or more sleeve sidewalls, and a lower opening in the one or more sleeve sidewalls proximate a lower end of the sleeve opposite the upper opening together defining a second cavity, securing an interchangeable water filter within a filter opening of a floatable body, the floatable body surrounding the filter opening and having a seal extending outward of an outer surface of the floatable body, disposing the floatable body within the sleeve such that the seal is engaged with the one or more sleeve sidewalls and restricts water from passing between the floatable body and the one or more sleeve sidewalls while the floatable body remains moveable within the second cavity between a first position proximate the pitcher base to a second position proximate the sleeve upper opening, filling a portion of the second cavity above the floatable body with unfiltered water deposited through the upper opening, dispensing filtered water by tipping the pitcher, pouring the filtered water from the second cavity below the floatable body through a channel formed by a void between the container and the sleeve, the channel extending from the second cavity through the lower opening of the sleeve to the pour lip proximate the upper end of the container, refilling the portion of the second cavity above the floatable body with unfiltered water after the all filtered water has been dispensed and the floatable body has auto-retracted to the first position in response to the dispensing of all filtered water, wherein filtered water is deposited into the second cavity below the floatable body after passing through the water filter as the floatable body moves within the sleeve toward the second position in response to a first pressure differential within the second cavity created by water filtering from above the floatable body to below the floatable body, and wherein the floatable body auto-retracts toward the first position, while maintaining engagement with the one more sleeve sidewalls and relative orientation in relation to the pitcher base, in response to a second pressure differential within the second cavity created by pouring filtered water from the second cavity through the channel by tipping the pitcher, wherein the auto-retraction toward the first position is concurrent with the pouring of filtered water and in a direction opposite a direction of the filtered water moving through the channel to the pour lip.

Particular embodiments may comprise one or more of the following. Coupling a removable lid to the upper end and the upper opening. One of the lower end of the sleeve and the pitcher base may comprise a protrusion, and wherein disposing the removable sleeve in the first cavity of the container further may comprise mating the other of the lower end of the sleeve and the pitcher base with the protrusion.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112, ¶ 6. Thus, the use of the words "function," "means" or "step" in the Detailed Description or Description of the Drawings or claims is not intended to somehow indicate a desire to invoke the special provisions of 35 U.S.C. § 112, ¶ 6, to define the invention. To the contrary, if the provisions of 35 U.S.C. § 112, ¶ 6 are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112, ¶ 6. Moreover, even if the provisions of 35 U.S.C. § 112, ¶ 6 are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements.

FIG. 4 is a partial cross-sectional view of a second embodiment of a drinking water filter system;

FIG. 7 is an exploded view of third embodiment of a drinking water filter system;

FIGS. 8A and 8B are perspective views of an embodiment of a lid having a knob;

FIGS. 9A and 9B are perspective views of an embodiment of a lid having a slider piece;

FIG. 13 is a perspective view of a water pitcher having a floatable water filtering body;

FIGS. 14-19 illustrate different views of the water pitcher of FIG. 13;

FIG. 20 illustrates the floatable body at the base of the cavity immediately after unfiltered water is poured into the cavity;

FIG. 21 illustrates the floatable body as it rises in the cavity during filtering of the water;

FIG. 22 illustrates the floatable body after it rises to the top of the cavity and the unfiltered water is filtered;

FIGS. 23-25 illustrate enlarged portions of FIGS. 20-22;

FIG. 26 illustrates an exploded view of the floatable body;

FIGS. 27-30 illustrate different views of the y-ring;

FIG. 37 illustrates the floatable body including the water filter;

FIGS. 38-44 illustrate various views of the floatable body of FIG. 37;

FIG. 45 illustrates an exploded view of the floatable body;

FIG. 46 illustrates the insertion of the water filter by rotation into the floatable body member;

DETAILED DESCRIPTION

This disclosure, its aspects and implementations, are not limited to the specific components or assembly procedures disclosed herein. Many additional components and assembly procedures known in the art consistent with the intended water filter system and/or assembly procedures for a water filter system will become apparent for use with implementations of water filter systems from this disclosure. Accordingly, for example, although particular containers, seals, and filters are disclosed, such containers, seals, and filters and implementing components may comprise any shape, size, style, type, model, version, measurement, concentration, material, quantity, and/or the like as is known in the art for such water filter systems and implementing components, consistent with the intended operation of a water filter system.

Various embodiments of water filter systems contemplated as part of this disclosure are advantageous to water filter systems previously known in the art because the systems eliminate wasted space often present in conventional water filter systems. For example, conventional water filter systems include a reservoir that holds unfiltered water as it is filtered into a pitcher. When all or most of the water is unfiltered and in the unfiltered reservoir, the pitcher is empty or nearly empty, and thus wasted space. Conversely, when all or most of the water is filtered and in the pitcher, the unfiltered reservoir is empty or nearly empty, and thus wasted space. In essence, then, from 30%-50% of conventional water filter systems is empty or wasted space. This space is critical in a refrigerator or dining area. In contrast to these conventional water filter systems, various embodiments of the water filter system contemplated as part of this disclosure eliminate substantially all empty or wasted space in the system through use of a floatable seal.

Figure 1:
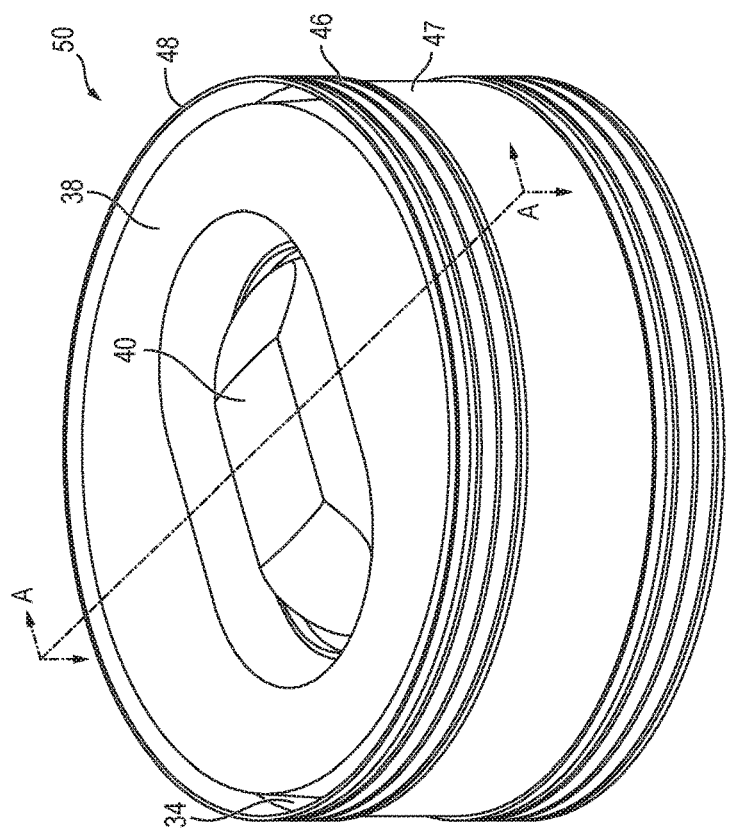
FIG. 1 is a perspective view of a first embodiment of a floatable seal and filter.

FIG. 1 depicts a non-limiting embodiment of a floatable seal 50 surrounding a replaceable water filter 40. In the non-limiting embodiment depicted in FIG. 1, the filter 40 is positioned substantially central on the floatable seal 50. In other embodiments, the filter 40 may be positioned elsewhere on the floatable seal 50. In particular embodiments, due to balance concerns, it may be advantageous to position the filter in substantially the balance center of the floatable seal 50 so that it moves upward as it filters more evenly. The filter 40 is configured to filter unfiltered water positioned above, in relation to gravity, the floatable seal 50 through the filter 40 to an area below the filter 40. In one or more embodiments, no additional force beyond the force of gravity is required for the unfiltered water to pass through the filter 40. The filter 40 may comprise any filter previously known in the art and adapted to couple to the floatable seal 50. In one or more embodiments, the filter 40 comprises a charcoal filter or any other known water-filtering device. The specific type of water filter used is not critical to the embodiments illustrated herein unless otherwise indicated. More particular embodiments may comprise a filter 40 having a filth or exhaustion indicator that indicates the approximate life of the filter 40 or when the filter 40 needs replacements. According to another aspect, the filter 40 may be configured to measure and display the temperature of the water within the container.

One or more embodiments of a filter 40 may be fixedly or removably coupled to the floatable seal 50 according to various aspects of the water filtering system contemplated herein. As depicted in the non-limiting embodiment depicted in FIG. 2, the filter 40 is sized to rest upon a ledge or lip 44 on a filter opening 36 extending at least partially through the body 38 of the floatable seal 50. In this and other embodiments, the filter 40 is adapted for simple efficient removal and replacement of the replaceable water filter 40 associated with the seal 50. In one or more embodiments, the filter 40 may comprise a filter ring 41 extending from the filter 40 and positioned to engage with the lip 44 on the filter opening 36. Such engagement holds the filter 40 in place and allows water to pass from above the floatable seal 50 to below the floatable seal 50 only through the filter 40.

The floatable seal 50 may comprise any shape complementary to the shape of the container 49 with which the floatable seal 50 will be utilized. In the particular non-limiting embodiment depicted in FIG. 1, the floatable seal 50 is substantially cylindrical in shape. The floatable seal 50, then, is configured for use within a substantially cylindrical container 49 such as a pitcher or cup. Pitchers are typically larger than cups. In other embodiments, the floatable seal 50 may comprise any shape complementary to the shape of the container 49 with which the floatable seal 50 is utilized, including but not limited to oval, triangular, square, or any other polygonal shape (when viewed from above or below).

Figure 2:
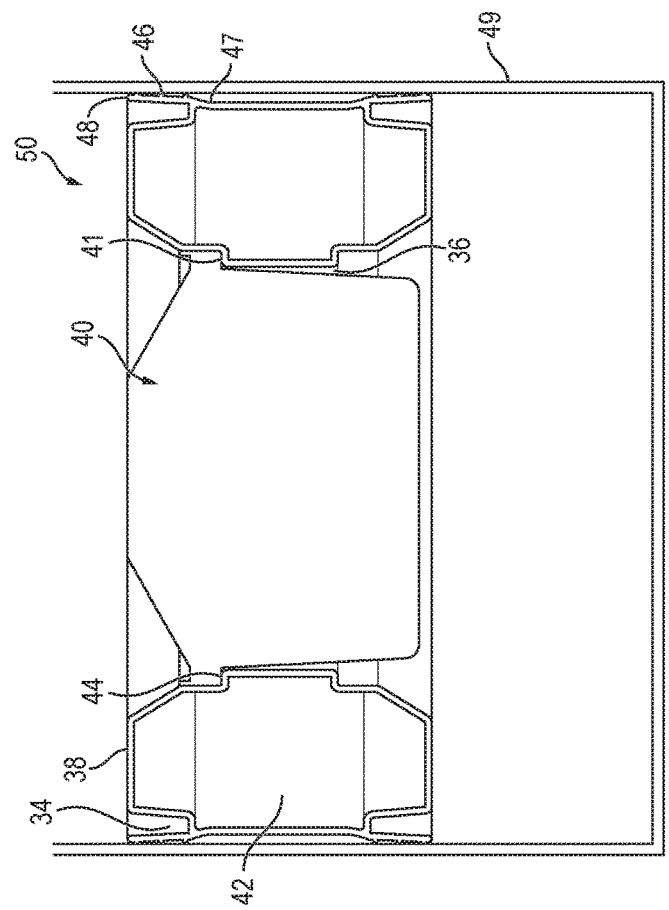
FIG. 2 is a cross-sectional view of a first embodiment of a floatable seal taken along line A-A of FIG. 1 and placed in a container.

FIG. 2 depicts a cross-sectional view of a non-limiting embodiment of a floatable seal 50 positioned within a container 49, the floatable seal 50 having a filter 40 mounted therein. In one or more embodiments, the floatable seal 50 comprises a filter body 38 comprising a filter opening 36 extending therethrough that is sized to receive the filter 40. The filter opening 36 may comprise a ring 41 or alternatively may narrow to allow mounting of the filter 40 therein.

As previously referenced, the seal typically comprises a floatable seal 50. In the non-limiting embodiment depicted in FIG. 2, the floatable seal 50 comprises a floatable body 38 housing a gas-filled annular chamber 42 therein filled with air or other gas such as, without limitation, helium, hydrogen, oxygen or nitrogen. In one or more embodiments, the annular chamber surrounds the filter opening 36 of the floatable seal 50. In other embodiments, the floatable seal 50 comprises a plurality of chambers comprising any shape that allows the floatable seal 50 to float on the filtered water after the water has passed through the filter 40. In particular embodiments, the plurality of chambers is disposed evenly around the floatable seal 50 to balance the floating characteristics of the floatable seal 50. In particular embodiments, the annular chamber 42 may comprise pressurized gas therein. In still other embodiments, a floatable material such as foam may replace or be used in combination with one or more chambers on the floatable seal 50. In particular embodiments, the chamber 42 is airtight.

As depicted in the non-limiting embodiments depicted in FIGS. 1 and 2, the floatable seal 50 may further comprise one or more sealing rings 46 extending outward from an outer surface 47 of the floatable seal 50. In particular embodiments, the floatable seal 50 comprises one more sealing rings 46 positioned on an upper portion of the outer surface 47 of the floatable seal 50 and one or more sealing rings 46 positioned on a lower portion of the outer surface 47 of the floatable seal 50. Even more particularly, the one or more rings may be positioned on an annular arm 48 extending from the floatable seal 50. In some embodiments, an annular arm 48 extends angularly from the body 38 of the floatable seal, a channel 34 being formed between the annular arm 48 and the body 38 of the floatable seal 50. According to one aspect, the floatable seal 50 comprises an upper annular arm 48 and a lower annular arm 48, each annular arm 48 comprising one or more sealing rings 46. According to other aspects, the floatable seal 50 comprises only one of the upper or lower annular arms 48. In one or more embodiments, an annular arm 48 is biased away from the floatable seal 50. The one or more arms 48 and/or the rings 46 are configured and positioned on the floatable seal 50 to restrict unfiltered water held above the floatable seal 50 from passing between the floatable seal 50 and the wall of the container 49 into the area of the container below the seal.

As illustrated by FIG. 2, the floatable seal 50 includes a first point, line or surface (collectively "point") at which the floatable seal 50 contacts the side of the pitcher 49, and a second point (point, line or surface), below the first point, that is more than half the distance between the top and the bottom of the floatable seal 50 away from the first point that acts as a balance point for the floatable seal 50. By including the seal contact point and a second point vertically offset from the seal that is positioned so that it may contact the sidewall of the pitcher, the float is able to maintain its relative orientation in relation to the pitcher bottom. The second point may be in contact with the side of the pitcher or sleeve, as with the example in FIG. 2 or the example in FIGS. 4-7 (balance tabs 22). Alternatively, the second point may include a gap between the second point and the pitcher or sleeve sidewall so that it is not in constant, direct contact with the side wall of the pitcher or sleeve but is available to contact the side if needed to maintain the relative orientation of the float in relation to the pitcher bottom, as with the example of FIGS. 20-22, the example of FIGS. 31-33, and the example of FIGS. 60-62. To reduce friction between the parts of the filter float and its surrounding surfaces, the filter float may be constructed so that only the seal contacts the surrounding surfaces. By including a slight gap, the filter float seal is able to more readily move up and down, and maintain the orientation of the filter float in the pitcher if the pitcher is tipped or if the filter float is poked or pressure is applied unevenly to the float, such as water pouring into the cavity and contacting only one side of the float.

As depicted in FIG. 2, the container 49 typically comprises a shape complimentary to the shape of the floatable seal 50. For example, in the non-limiting embodiment depicted in FIG. 2, both the container 49 and the outer boundary of the seal are substantially cylindrical in shape. In other embodiments, the container 49 may comprise any shape complementary to the shape of the floatable seal 50 such that the floatable seal 50 is slidable within the wall or walls of the container 49 and still restricts or in some cases prevents passage of water between the floatable seal and the wall or walls of the container 49. The container 49 is likewise sized to allow sliding of the floatable seal 50 within the container 49 and maintaining the floatable seal 50 between the floatable seal 50 and the wall or walls of the container 49. Typically, the walls of the container 49 are substantially vertical or perpendicular to the base of the container 49. Thus, the portion of the container 49 that interfaces with the floatable seal 50 comprises a uniform diameter or width that allows for the combination sliding and sealing features described above. According to some aspects, the cylindrical nature of the floatable seal 50 and/or the annular arms 48 of the floatable seal 50 discourage the floatable seal 50 from tipping once the floatable seal 50 is within the container 49.

The floatable seal 50 may be made of any of a variety of materials. In one or more embodiments, the floatable seal 50 comprises a plastic seal. More particularly, the floatable seal 50 comprises plastic pieces sonically welded, adhesively glued, compression fit or otherwise coupled to one another. In particular, non-limiting embodiments, the floatable seal 50 or any floatable seal disclosed herein may comprise polypropylene, as well as a float overmold comprising a thermoplastic elastomer (TPE) or GLS Versaflex™ CL. The annular arm 48 and/or sealing rings 46 may likewise be plastic or, alternatively, a rubber material. In still other embodiments, the floatable seal 50 comprises a rubber or silicon seal. The container 49 of this embodiment or any other containers, pitchers, cups, and the like disclosed herein may be made of any of a variety of materials known in the art, such as but not limited to plastic, metal, wood, glass, rubber, polycarbonate, clear acrylic, and the like. Any of the containers disclosed herein may further comprise a pitcher overmold comprising TPE and/or GLS Versaflex™ OM. In one or more embodiments, the container comprises a spout or straw extending outward from the base of the container 49. Alternatively, the container 49 may comprise an opening at the base of the container 49 configured to receive a straw or spout. The container 49 may further comprise a plug that plugs the spout or straw during filtration. Through the inclusion of a spout or straw opening from the base of the container 49, the filtered water may be poured or sucked out of the container 49 while unfiltered water is still passing through the filter 40.

In operation, a method of filtering water may utilize embodiments of the floatable seal 50 and container 49 disclosed herein. The floatable seal 50 is typically placed into the container 49. The filter 40 may be mounted or coupled to the floatable seal 50 prior to placing the floatable seal 50 in the container 49 or after placing the floatable seal 50 in the container 49. The floatable seal 50 may be placed on the bottom of the container 49 when it is empty or, alternatively, placed on filtered water already present in the container 49. The floatable seal 50 is positioned such that a seal is formed between the walls of the container 49 and the floatable seal 50. In such positioning, typically the only fluid communication between the area above the floatable seal 50 and the area below the floatable seal 50 is through the filter 40.

Once the floatable seal 50 is positioned appropriately in the container 49, unfiltered water is poured into the container. The floatable seal 50 may be positioned approximately 0.25-1.0 inches above the bottom base of the container 49 in particular implementations to provide additional space for the initial filtered water to filter prior to the filtered water starting to float the seal. In some embodiments, a spacer component may be coupled to or integrated into the design of the floatable seal 50 to establish the gap between the floatable seal 50 and the bottom surface of the base inside of the container 50. In yet other embodiments, as illustrated in the structure of the floatable seal 50 in FIG. 2, the floatable seal 50 may be placed adjacent to the bottom surface of the base inside of the container 49 and a gap between the filter 40 and the bottom of the body 38 floatable seal 50 allows filtered water to start to float the floatable seal 50.

The floatable seal 50 and filter hold the unfiltered water in the unfiltered chamber or area above the floatable seal 50 as the unfiltered water passes through the filter 40. Water passes from the area above the filter 40 to the area below the floatable seal 50 only through the filter 40, and not between the floatable seal 50 and walls of the container 49. As the water passes through the filter 40, the floatable seal 50 floats on the filtered water below the floatable seal 50 and is biased through the water above it to float above that water too, thus increasing the volume of the area below the floatable seal 50 and decreasing the volume of the area above the floatable seal 50. Once all the water above the floatable seal 50 has passed through the floatable seal 50, the floatable seal 50 and filter 40 may be removed from the container 49. In other embodiments, a spout may be included within the container 49 extending from the bottom of the container 49 so that water may be poured from the container 49 without removal of the floatable seal 50 and filter 40.

Figure 3:
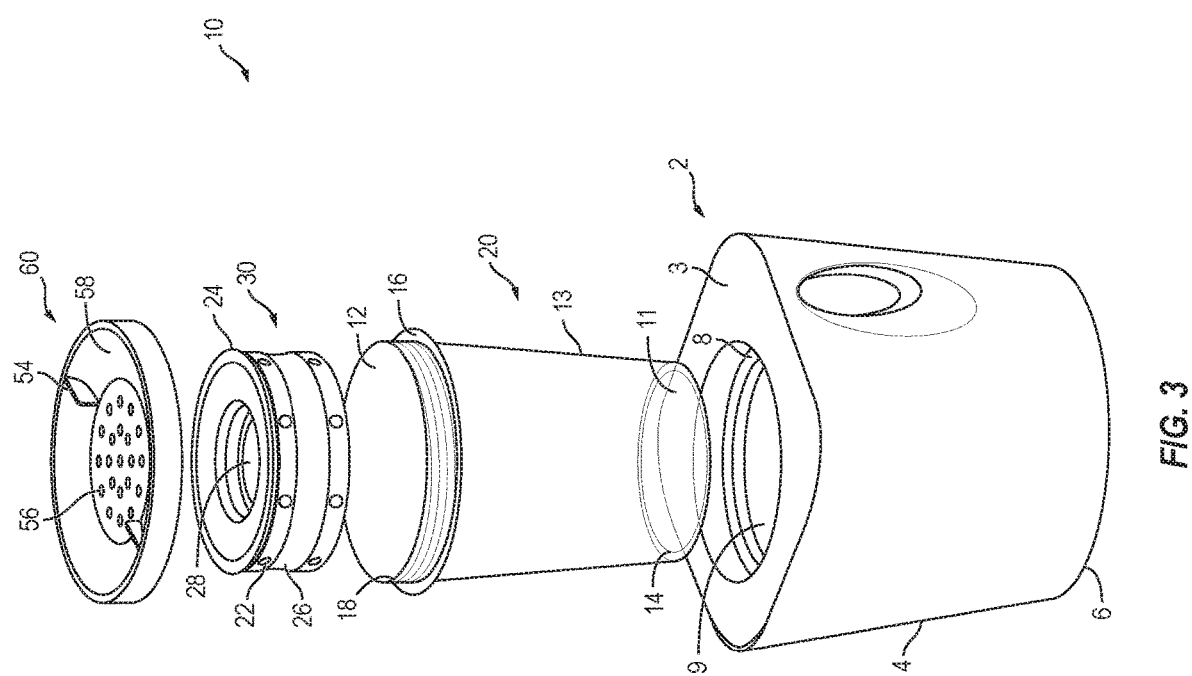
FIG. 3 is an exploded view of a second embodiment of a drinking water filter system.

According to some aspects, a water filter system may be further configured to comprise a filter sleeve 20 in addition to a floatable seal 30 and filter 40. In particular, FIG. 3 depicts an exploded view of a non-limiting embodiment of a water filter system 10 comprising a pitcher 2, a filter sleeve 20, a floatable seal 30, and a lid 60. The floatable seal 30 and filter 40 may comprise any of the floatable seals and filters and their characteristics and alternatives as described elsewhere in this document.

The pitcher 2 may comprise any container known in the art or described elsewhere in this document and adapted for use with a filter sleeve 20. In one or more embodiments, the pitcher 2 comprises one or more walls 4 forming a chamber 7 sized to house the filter sleeve 20 therein, a base 6, and a sleeve opening 9 distal the base 6. The sleeve opening 9 is sized and configured to allow at least a portion of the filter sleeve 20 to pass through the sleeve opening 9. According to some aspects, the pitcher 2 is configured to allow mounting of the filter sleeve 20 thereto. The sleeve opening 9 is typically bordered by the rim 8 that interfaces with mounting lip 16 on the filter sleeve 20 to mount the filter sleeve 20 within the sleeve opening 9. More particularly, the pitcher 2 may comprise a rim 8 proximate the filter opening 9. According to some aspects, the rim 8 is formed integral with a pitcher lid 3. The pitcher lid 3 may be integral with the walls 4 of the pitcher 2 or, alternatively, may be removably coupled to the wall 4 opposite the base 6. Additional threading or locking tabs may border the sleeve opening 9 for removable coupling of filter sleeve 20 to the pitcher lid 3. The pitcher may further comprise a spout opening, or pouring lip, extending at least partially through the pitcher lid 3. In still other embodiments, the rim 8 may be formed without a pitcher lid 3.

FIGS. 3 and 4 also depict a non-limiting embodiment of a filter sleeve 20. The filter sleeve 20 typically comprises a hollow sleeve with a first or bottom open end 11 and a second or top open end 12 opposite the first open end 11 and in fluid communication with the first open end 11. The filter sleeve 20 may comprise a variety of shapes formed by one or more walls 13 of the filter sleeve 20, such as but not limited to a cylindrical sleeve as depicted in FIGS. 3 and 4. In other embodiments, the cross-sectional shape of a filter sleeve may comprise an oval, a triangle, a rectangle, a square, a pentagon, and so on. The filter sleeve 20 is typically shaped complementary to the shape of the sleeve opening 3 in the pitcher 2. In one or more embodiments, the inner surface 18 of the walls 13 of the filter sleeve comprise zero-draft walls.

As noted above, one aspect of a filter sleeve 20 comprises a mounting lip 16 proximate a second or top end 12 of the of the filter sleeve 20. The mounting lip 16 is positioned on the filter sleeve 20 such that when the mounting lip 16 is interfacing or engaging with the rim 8 of the pitcher 2, the bottom or first end 11 of the filter sleeve 20 is not in direct contact with the base 6 of the pitcher 2. That is, a space exists between the bottom end 11 of the filter sleeve 20 and the base 6 of the pitcher when the mounting lip 16 is engaged with the rim 8 of the pitcher 2 or otherwise removably coupled to the pitcher lid 3. The mounting lip 16 may extend outward from the outer surface of the one or more walls 13 of the filter sleeve 20 and may surround the entire outer surface of the filter sleeve 20. In other embodiments, the mounting lip 16 comprises a plurality of mounting lips extending outward from the outer surface of the wall 13 of the filter sleeve 20 to hold the filter sleeve 20 suspended within the pitcher 2. The mounting lip 16 is typically sized and positioned to interface with the rim 8 of the pitcher 2. In some embodiments, the filter sleeve 20 may comprise threading or tabs for engaging with threading or tabs on the pitcher lid 3. The mounting lip 16 itself may engage with tabs or threading on the pitcher lid 3.

One or more embodiments of a filter sleeve 20 further comprise sleeve threading or tabs proximate the top end of the sleeve. The threading or tabs proximate the top end 12 of the filter sleeve 20 are typically configured to engage with threading or tabs on the sleeve lid 60 for removable coupling of the sleeve lid 60 to the filter sleeve 20. According to one aspect, the threading or tabs of the filter sleeve 20 are positioned between the top end 12 of the filter sleeve 20 and the mounting lip 16 of the filter sleeve 20.

One or more embodiments of a filter sleeve 20 further comprise a stop lip 14 proximate a first or bottom end 11 of the filter sleeve 20. FIG. 4 depicts a cross-sectional view of a non-limiting embodiment of water filter system 10, including a filter sleeve 20 comprising a stop lip 14. According to some aspects, the stop lip 14 extends inward from an inner surface 18 of the one or more walls 13 of the filter sleeve 20. The stop lip 14 is sized to engage with the floatable seal 30 and restrict the floatable seal 30 from sliding from the filter sleeve 20 into the pitcher 2.

The inner surface 18 of the wall(s) 13 of the filter sleeve 20 are typically smooth between the top end 12 and the stop lip 14 of the filter sleeve 20 to allow sliding of the floatable seal 30 between the top end 12 and the bottom end 11 of the filter sleeve 20. In one or more embodiments, the inner surface 18 of the filter sleeve 20 may comprise tracks configured to align with slots on the floatable seal 30. The filter sleeve 20 and the water pitcher 2 are formed separately and later assembled.

Figure 6:
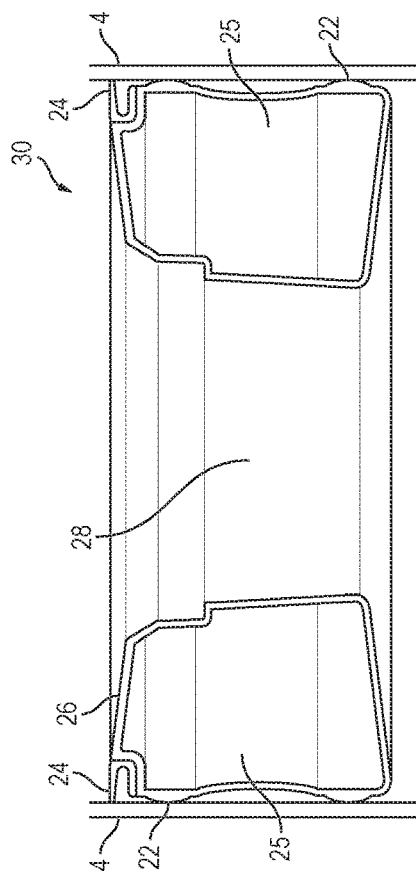
FIG. 6 is a cross-sectional view of a floatable seal taken along line B-B in FIG. 5 and positioned within a filter sleeve.
Figure 5:
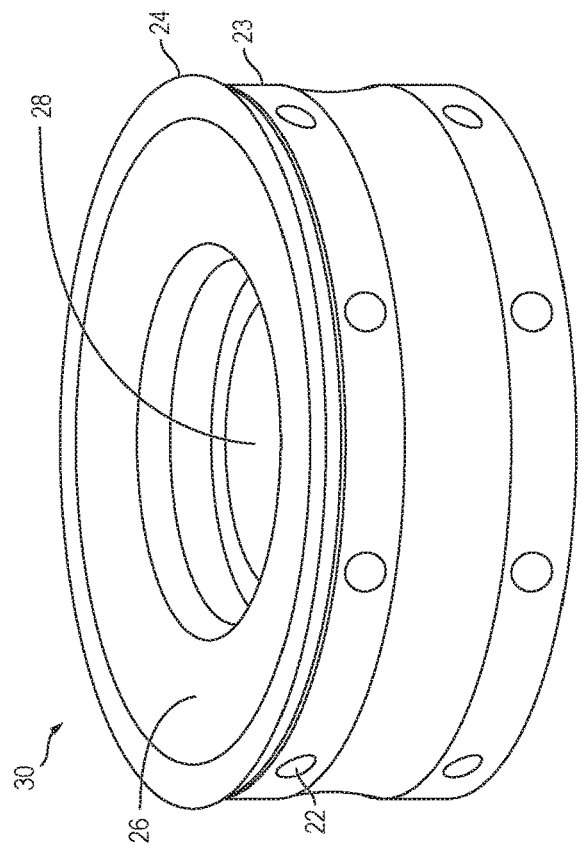
FIG. 5 is a perspective view of a second embodiment of a floatable seal.

FIGS. 5 and 6 depict a non-limiting embodiment of a floatable seal 30. The floatable seal 30 is configured to slide within in the filter sleeve 20 between the top end 12 and the bottom end 11. More particularly, the floatable seal 30 is configured to float on water within the pitcher 2 and rise within the filter sleeve 20 above the bottom end 11 of the filter sleeve 20 when the water level within the pitcher 2 is above the bottom end 11 of the filter sleeve 20. The floatable seal 30 is also configured to removably couple or mount to a water filter 40. When a water filter 40 is mounted to the floatable seal 30, the floatable seal 30 is positioned within the filter sleeve 20, and water is held within the filter sleeve 20 above the floatable seal 30, the floatable seal 30 is configured to restrict water from passing between the outer surface 23 of the floatable seal 30 and the inner surface 18 of the walls 13 of the filter sleeve 20. Instead, the floatable seal 30 is configured to allow water to only pass from the filter sleeve 20 to the pitcher 2 through the water filter 40.

The floatable seal 30 is typically shaped complimentary to the shape of the filter sleeve 20. For example, in the non-limiting embodiment depicted in FIGS. 3 and 4, the floatable seal 30 is substantially cylindrical in shape to complement the cylindrical channel of the filter sleeve 20. In one or more embodiments, the floatable seal 30 comprises a plurality of balance tabs 22 positioned on an outer surface 23 of the floatable seal 30. The plurality of balance tabs 22 are sized to interface with the inner surface 18 of the wall 13 of the filter sleeve 20. The balance tabs 22, like other second contact points in other embodiments, discourage the floatable seal from tipping or wobbling within the filter sleeve 20, while also decreasing the amount of surface area of the floatable seal 30 in contact with an inner surface 18 of the filter sleeve 20. Decreasing the surface area in contact with the inner surface 18 of the filter sleeve 20 reduces the friction between the floatable filter 30 and the filter sleeve 20, thus allowing for easier sliding motion of the floatable filter 30 within the filter sleeve 20. The floatable seal 30 may further comprise a concave portion between the top and bottom of the floatable seal 30, for example and without limitation, as illustrated in FIGS. 5 and 6.

The floatable seal typically further comprises a sealing ring 24 sized and positioned to interface with the inner surface 18 of the wall 13 of the filter sleeve 20. In the non-limiting embodiment shown in FIGS. 5 and 6, the sealing ring 24 is proximate a top of the floatable seal. In other embodiments, the sealing ring 24 may be positioned elsewhere on the floatable seal 30, such as but not limited to a bottom portion or a central portion. FIG. 6 depicts a cross-sectional view of a floatable seal 30 having a sealing ring 24. According to some aspects, the sealing ring 24 comprises a rubber seal either fixedly or removably coupled to the floatable seal 30. In some embodiments, the sealing ring 24 is over-molded to the floatable seal 30. The sealing ring 24 is configured to restrict water from passing between the outer surface 23 of the floatable seal 30 and the inner surface 18 of the wall 13 of the filter sleeve 20. The sealing ring 24 is also configured to allow the floatable seal 30 to slide within the filter sleeve 20 while simultaneously restricting the passage of water between the outer surface 23 of the floatable seal 30 and the inner surface 18 of the walls 13 of the filter sleeve 20. According to some aspects, the floatable seal comprises a plurality of sealing rings 24. The sealing ring 24 may comprise a rubber, plastic, or any other suitable material.

Aspects of the floatable seal 30 may further comprise any of the other elements of a floatable seal described elsewhere in this document relating to other embodiments of a floatable seal. For example, the floatable seal 30 may comprise a filter opening 28 and ledge or lip for coupling and mounting of the filter 40 to the filter opening 28. According to some aspects, the floatable seal 30 may comprise an over-molded seal positioned on the lip around the filter opening 28. The over-molded seal is configured to restrict water from seeping between the filter 40 and the floatable seal 30. In other aspects, the filter 40 may be threadedly coupled to the floatable seal 30. In still other embodiments, the floatable seal 30 may comprise a textured, ribbed, or other non-planar surface, particularly at the lip adjacent the filter opening 28. The filter 30 may comprise complementary texturing, ribbing, or other non-planar surfacing to form a seal between the filter 40 and the floatable seal. In these or other embodiments, the filter 40 may snap-fit to the floatable seal 30.

Additionally, as the floatable seal 30 is configured to float on water, the floatable seal 30 may comprise any of the configurations or materials described elsewhere in this document that allow the floatable seal to float on water, such as but not limited to a gas-filled chamber 25. In any of the embodiments described herein, the floatable seal 30 may be configured such that the filter 40 is offset or not planar with the bottom of the floatable seal 30. In this way, the filter 40 stays out of the filtered water below the floatable seal 30.

In operation, the floatable seal 30 and filter 40 may rest anywhere within the filter sleeve 20 when no water is held within the filter sleeve 20 above the floatable seal 30 and filter 40. According to some embodiments, the floatable seal 30 and filter 40 rest on either the water within the pitcher 2 or the stop lip 14, whichever is lower, when no water is held within the filter sleeve 20 above the floatable seal 30 and filter 40. As water is added to the filter sleeve 20 above the floatable seal 30 and filter 40, water begins to pass from the filter sleeve 20 to the pitcher 2 only through the filter 40. As water passes from the filter sleeve 20 to the container through the filter 40, the water level within the pitcher 2 rises and the floatable seal 30 floats on the water within the pitcher 2 and filter sleeve 20. Thus, the floatable seal 30 rises within the filter sleeve 20 as the water in the pitcher 2 rises.

Embodiments of the floatable seal systems contemplated as part of this disclosure are configured to filter water at various rates. For example, some of the filters 40 are configured to filter approximately ½ to approximately 3 cups of water per minute. More particularly, some of the filters 40 are configured to filter approximately 1 to 3 cups of water per minute. Even more particularly, some of the filters 40 are configured to filter approximately 1 cup of water per minute.

As depicted in the non-limiting embodiment of FIG. 3, various embodiments of a water filter system further comprise a sleeve lid 60. The sleeve lid 60 is typically configured to removably couple to either the container lid 3 or the filter sleeve 20. In the non-limiting embodiment of FIG. 3, the sleeve lid 60 is configured to removably and threadedly couple to the filter sleeve 20. According to some embodiments, the filter sleeve 20 further comprises one or more openings 56 and a funnel-shaped portion 58 that allow a user to insert water into the filter sleeve 20 without removing the sleeve lid 60. The one or more openings may covered by a biased flap, as depicted in the non-limiting embodiment of FIG. 10.

FIG. 7 depicts other non-limiting embodiments of a sleeve lid 62, floatable seal 30, and a filter sleeve 64. While in the non-limiting embodiment of FIG. 3 the sleeve lid 60 threadedly couples with an outer surface of the filter sleeve 20, in the non-limiting embodiment of FIG. 5, the sleeve lid 62 is configured to threadedly couple to the interior surface 65 of the filter sleeve 64. For example, the floatable seal 30 may be inserted into the filter sleeve 64, and then a threaded portion 78 at an open first or top end 74 of the lid 62 may be threadedly coupled to a threaded portion 76 on the interior surface 65 of the filter sleeve 64.

Some embodiments, such as the embodiment depicted in FIG. 7, comprise a filter sleeve 64 configured to removably couple to another apparatus, such as but not limited to a water bowl for a pet. For example, an open second or bottom end 72 of the filter sleeve 64 may removably couple to a pet dish. In operation, the floatable seal 30 and filter sleeve 64 may be configured similar to and work similar to those described elsewhere in this document.

According to some embodiments, a sleeve lid comprises a funnel shaped portion and a plurality of small holes at the base of the funnel shaped portion. This configuration allow for water to be more easily inserted into the filter sleeve. According to some aspects, the center portion of the filter cap is movable between to positions to either open or close the plurality of small holes. FIGS. 8A and 8B depict another non-limiting embodiment of a sleeve lid 80. In this particular embodiment, the sleeve lid 80 comprises a funnel-shaped portion 86. This particular embodiment further comprises a knob 82 on the sleeve lid 80 that is movable between two positions. When the knob 82 is pulled up to a first position (shown in FIG. 8A), water is allowed to pass through the sleeve lid 80. When the knob 82 is pushed down to a second position (shown in FIG. 8B), water is restricted from passing through the sleeve lid 80. When the knob 82 is pushed down and the rotated, the sleeve lid 80 may be removed. The sleeve lid 80 may be adapted for use with any of the water filter systems described in this document.

FIGS. 9A and 9B depict another non-limiting embodiment of a sleeve lid 100. In this particular embodiment, the sleeve lid 100 comprises a slider piece 102. The slider piece 102 is configured to cover the spout exit of the pitcher when the opening 104 on the sleeve lid 100 is uncovered to allow unfiltered water to enter the filter sleeve 20. When the slider piece 102 is slide to cover the opening 104, the spout exit is uncovered to allow filtered water to be poured from the container to a cup through the spout. The sleeve lid 100 may further comprise a depression that may be used to rotate the sleeve lid 100 from a locked to an unlocked position. The sleeve lid 100 may be adapted for use with any of the water filter systems described in this document.

Figure 10B:
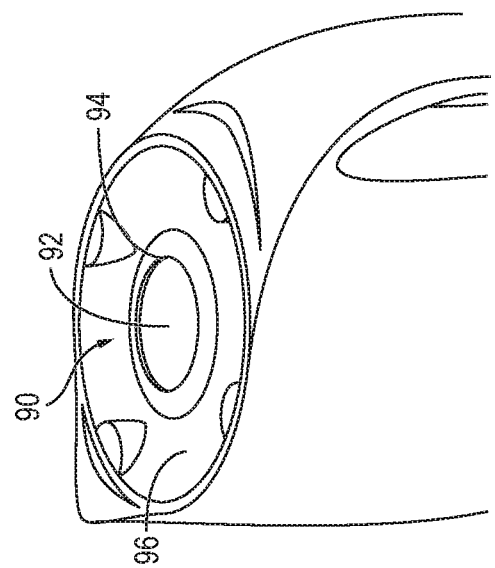
FIGS. 10A and 10B are perspective views of an embodiment of a lid having a biased flap.
Figure 10A:
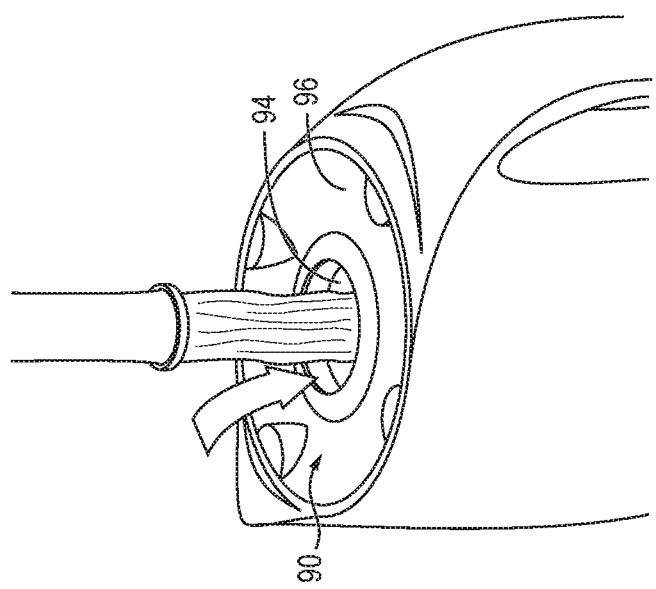

FIGS. 10A and 10B depict another non-limiting embodiment of a sleeve lid 90. In this non-limiting embodiment, the filter lid 90 comprises a funnel shaped portion 96. At the base of the funnel shaped portion 96 is a biased flap 92. The biased flap 92 closes an opening 94 in the filter lid 90 unless a force is exerted on the biased flap 92. When water from a faucet comes in contact with the biased flap 92, the force is typically strong enough to push the biased flap 92 down to uncover the opening 94 and allow water to enter the filter sleeve 20. The filter lid 90 may further comprise raised nubs to allow a user to screw on and off the lid 90. The sleeve lid 90 may be adapted for use with any of the water filter systems described in this document.

Figure 11B:
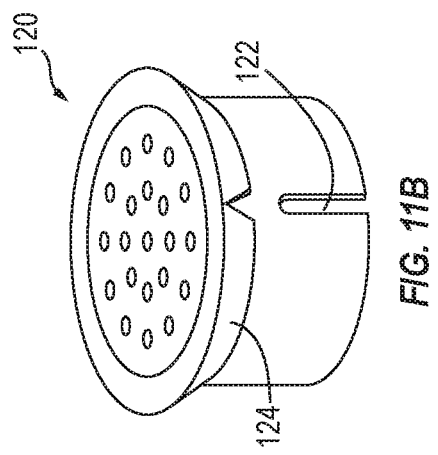
FIG. 11B is a perspective view of a first embodiment of a filter having a key channel.
Figure 11A:
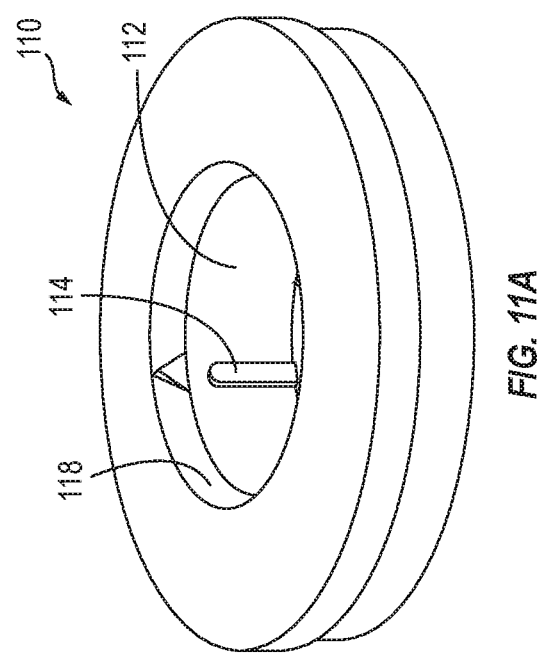
FIG. 11A is a perspective view of a first embodiment of a floatable seal having a keyed feature.

FIGS. 11A and 11B depict a non-limiting embodiment of a floatable seal 110 and filter 120 according to one aspect of a water filter system. In one or more embodiments, a floatable seal 110 comprises a protruding tab 114 on the filter opening 112 that acts as a key to properly align with and lock the filter 120 into place. The filter 120 may comprise complementary positioned slots 122 sized to engage with the protruding tabs 114 on the filter opening 112. According to some aspects, the floatable seal 110 further comprises an angled edge 118 surrounding the filter opening 112. In such embodiment, the filter 120 typically includes an angled edge 124 complementary to the angled edge 118 of the floatable filter 110 such that the two angled edges 118, 124 interface with one another with the filter 120 is mounted to the floatable seal 110. The floatable seal 110 may comprise aspects of any other floatable seals disclosed herein. The floatable seal 110 and filter 120 may be adapted for use with any water filter systems contemplated in this disclosure.

Figure 12B:
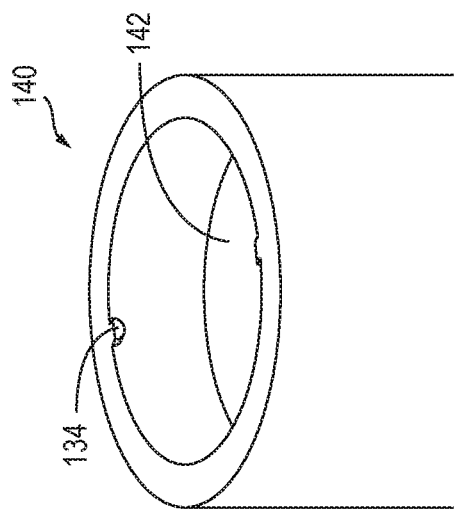
FIG. 12B is perspective view of a second embodiment of a filter having a keyed feature.
Figure 12A:
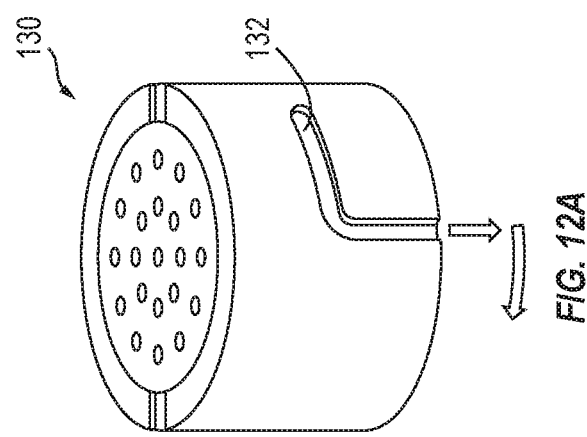
FIG. 12A is a perspective view of a second embodiment of a filter having a key channel.

FIGS. 12A and 12B depict additional non-limiting embodiments of a floatable seal 140 and a filter 130. According to some aspects, the floatable seal 140 comprises a protruding tab 134 extending into the filter opening 142 and the filter 130 comprises a slot 132. The slot 132 is configured such that the filter 130 is locked in to place by aligning the slot 132 with the protruding tab 134, pressing down, and then rotating the filter 130. The floatable seal 140 may comprise aspects of any other floatable seals disclosed herein. The floatable seal 140 and filter 130 may be adapted for use with any water filter systems contemplated in this disclosure.

Referring now to FIG. 13, there is shown a perspective view of another exemplary embodiment of a portable water filtration system generally shown as water pitcher 200. A top view of pitcher 200 is shown in FIG. 14, a front view in FIG. 15, a side view in FIG. 16, an end view in FIG. 17 and another side view in FIG. 18. Pitcher 200 is seen to comprise a water container 202 formed by a generally cylindrical sidewall 204 and a base 206 together forming a cavity 208 therein as shown in FIG. 19 with the lid 212 removed. The pitcher has a handle 210 and a pivotable lid 212. A fill opening 214 is formed in the lid 212 and is shown to comprise a deflectable flap 216 disposed over the opening 214. The flap 216 is configured to selectively allow water to be poured through opening 214 to fill the pitcher 200 with unfiltered water and prevent splashing of the filtered water out of the container. The pitcher has a pour lip 218 at an upper portion of the sidewall 204 proximate an upper rim 220 of the pitcher. The pour lip 218 is configured to dispense filtered water via a channel (or spout) 222 formed in the sidewall 204, between an outer wall 243 and an inner wall 244, inside cavity 208 as shown in FIG. 20, the channel 222 extending from the upper rim 220 to the cavity 208 proximate the base 206 of the pitcher 200. As shown in FIG. 22, the channel 222 may be in fluid communication with the cavity 208 through a passageway 249. According to some embodiments, the passageway 249 may be defined by a terminal end 245 of the inner wall 244, which may be spaced above the base 206 by a distance 246. As the floatable body 230 approaches the base 206, the passageway 249 may reduce in size. In some embodiments, the seal 250 of the floatable body 230 is located above the terminal end 245 when the floatable body 230 is at the lowest accessible point within the cavity 208.

Although the non-limiting pitcher example illustrated in FIGS. 13-19 includes a generally cylindrical sidewall, it should be understood that other sidewall shapes may alternatively be used provided a correspondingly shaped floatable body is used. For example, it is specifically contemplated that instead of a circular cross-section of the cylindrical sidewall, an oval cross-section, an elliptical cross-section, an arch-shaped cross-section, or square or rectangular cross-section may be used.

Referring now to FIGS. 20, 21 and 22, there are shown cross sectional views of the pitcher 200 taken along a cross section A-A as shown in FIG. 17 for various levels of filtered water within the pitcher 200. FIG. 20 shows a floatable body 230 comprising a housing 231 including a centrally located filter adapter opening 232 receiving an interchangeable water filter 234. The floatable body 230 resides at the bottom of the cavity 208 when there is no water in the cavity 208, and when unfiltered water is initially poured into the pitcher 200. The floatable body 231 member has a generally annular shape, like a donut, having a gas-filled cavity 236 providing buoyancy to the floatable body 230.

FIG. 21 illustrates the floatable body 230 at a midsection of cavity 208 as gravity causes water to filter from an upper portion 238 of cavity 208 holding unfiltered water to a lower portion 240 of the cavity 208 holding filtered water. The floatable body 230 rises in the cavity 208 as the amount of filtered water in lower portion 240 increases and the amount of unfiltered water in the upper portion 238 decreases. According to various embodiments, the floatable body 230 has a planar bottom surface 241 that is maintained parallel to a planar bottom surface 242 of the pitcher base 206 as it moves up and down within the pitcher.

FIG. 22 illustrates the floatable body 230 at the top of the cavity 208 when unfiltered water in the upper portion 238 has completely filtered into the lower portion 240. FIGS. 20-22 illustrate the water level of filtered water in the spout (or channel) 222 during the filtering process. According to various embodiments, the channel 222 extends from an inlet opening 247 to an exit opening 248, which may be proximate the pour lip 218.

An annular seal 250 is disposed about a periphery of floatable body member 231, and provides a liquid seal between the floatable body member 231 and an inner wall 252 of the sidewall 204 in all positions of the floatable body 230. In an alternative embodiment, the seal 250 may be over molded on the floatable body 230, and would have an acceptable durometer range. An acceptable durometer range includes a durometer measurement of between 30 and 90. In particular embodiments, a durometer measurement of 50 to 70 was determined acceptable, and an optimal durometer measurement of 55 to 65, and in particular embodiments a durometer measurement of 60 has been determined to be critical for the materials used. According to various embodiments, seal 250 may be composed of, rubber silicone, Teflon, or any other material known in the art, of appropriate durometer hardness.

Figure 31:
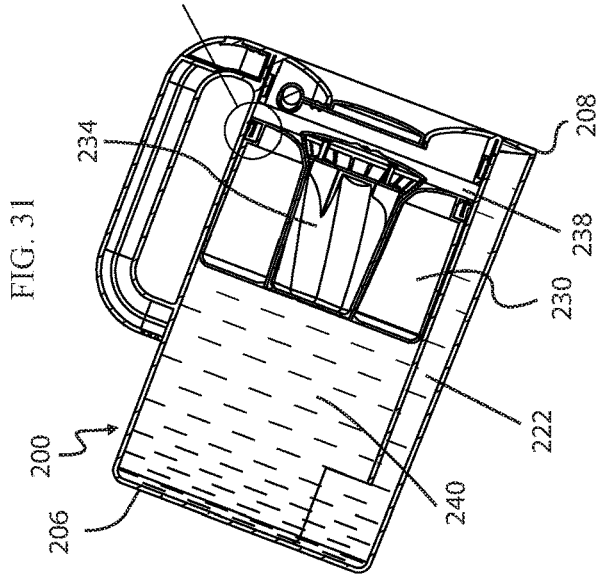
FIG. 31 illustrates the pitcher when initially tipped to dispense filtered water.
Figure 32:
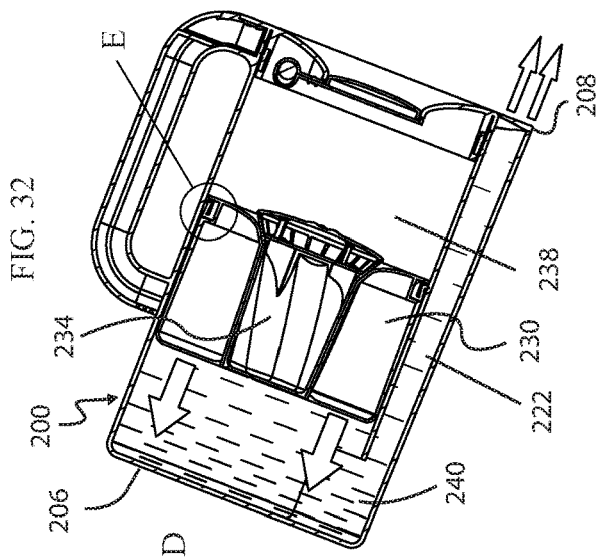
FIG. 32 illustrates the pitcher as filtered water is dispensed.
Figure 33:
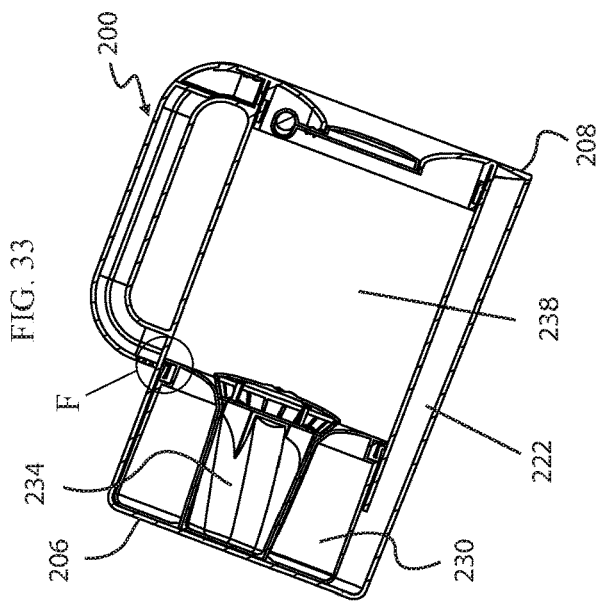
FIG. 33 illustrates the pitcher after all filtered water has been dispensed, showing that the floatable body auto-retracts toward the pitcher base.

FIG. 23 illustrates an enlarged view of a non-limiting embodiment of the seal and its engagement with inner wall interface at section A of FIG. 20. Advantageously, the seal 250 creates friction with the inner wall 252 that is greater when the floatable body 230 rises in cavity 208, and which friction is less when the floatable body 230 is lowered in the cavity 208, such as during initial insertion into an empty pitcher 200, and also when the floatable body 230 auto-retracts toward bottom 206 (e.g. away from exit opening 248) during dispensing of filtered water via the channel (or spout) 222 and pour lip 218 when tipped, as shown in FIGS. 31, 32 and 33. In some embodiments, the friction generated as the floatable body 230 rises is at least two times the friction generated as the floatable body 230 lowers. In other embodiments, the friction generated during rising is up to six (6) times the friction generated during the lowering of the floatable body 230.

In one exemplary embodiment, the seal 250 is comprised of an annular y-ring or a u-ring, both shapes also referred to herein as a y-seal, as shown in FIG. 23 through FIG. 36. The y-seal 250 has an outwardly extending distal tapered tip 254 that is biased outwardly against the inner wall 252 when the floatable body 230 is initially disposed in the cavity 208 of pitcher 200 to provide a liquid seal. The y-seal 250 is resiliently biased outward to a rest position wherein the tapered tip 254 extending outward of the radius of the floatable body 230. By having a first portion of the y-seal 250 recessed into a side of the floatable body 230 while a second portion of the seal, including the tapered tip 254, extending outward of the radius of the floatable body in its rest position, the tapered tip 254 exerts pressure against the inner wall 252 of the pitcher to create a seal to resist against unfiltered water passing the floatable body 230 except through the filter 234. This configuration also provides a more consistent friction force against the inner wall 252 to adapt for inconsistencies in the topography of the inner wall 252 surface, and even for angled inner wall 252 surfaces becoming wider between the bottom of the pitcher 206 and the top of the pitcher.

As shown in FIG. 23, the tip 254 extends generally horizontal from an upwardly extending arm 256 of seal 250, and may be distended slightly upward while engaging the inner wall 252. The seal 250 has a narrowed hinge portion 258 that allows the seal portion (i.e. a second portion) including tip 254 to bend thereat and facilitate the tip 254 being distended upwardly and downwardly. The seal 250 has an upwardly extending portion 260 (i.e. a first portion) that is parallel to, and thicker than, the arm 256 and also has a midsection bridge 262 connecting the arm 256 to the portion 260. The seal 250 is configured to be securely disposed in an annular recess 270 of floatable body member 231, as shown in FIG. 26. By using a y-shaped seal as opposed to a common round seal, the friction between the tip 254 and the inner wall 252 may vary depending on the direction of movement while maintaining a fluid seal that can adapt for inconsistencies in the inner wall 252 surface. Furthermore, the tip 254 of seal 250 may also clean the surface of the inner wall 252 as it moves up and down, reducing mineral build-up which normally occurs and which may cause accelerated wear on the pitcher 200.

In one exemplary embodiment, the bottom side 299 (FIG. 21) of the floatable body is open and not enclosed by a bottom member. This configuration with floatable body 230 sides and top and filter adapter opening 232 still includes the chamber 236 within the side wall(s) of the floatable body 230 so that the gas is trapped below the top surface of the floatable body 230 to create buoyancy, but the bottom side 300 is removed to leave it open. This may simplify manufacture of the floatable body 230 in some instances, and reduce the weight of the floatable body. Although the particular embodiments illustrated in the various figures included in this disclosure each show a bottom side of the various embodiments, it should be understood that this bottom side is optional for particular embodiments and that the Figures should be understood to represent the floatable body both with and without the bottom side as any of the embodiments may be manufactured without the bottom side of the floatable body.

As previously discussed, FIG. 23 shows an enlarged view of section A of FIG. 20, illustrating the tip 254 distended slightly upward (i.e. tip 254 engages the sidewall at a first angle with respect to floatable body 230) as a consequence of the floatable body 230 is pushed (either by a pressure differential or manually) downward. FIG. 24 shows an enlarged view of section B of FIG. 21, illustrating the tip 254 distended slightly downward (i.e. tip 254 engages the inner wall 252 at a second angle with respect to floatable body 230) as the floatable body 230 floats upwardly. FIG. 25 shows an enlarged view of section C of FIG. 22, which also shows the tip 254 distended slightly downward as the floatable body 230 floats upwardly. When the tip 254 is distended slightly downward, the friction created between the tip 254 and the inner wall 252 is greater than when the tip 254 is distended slightly upward, as previously discussed. According to various embodiments, the angle at which the tip 254 engages the inner wall 252 is able to vary between a first slightly downward angle and a second slightly upward angle while maintaining a fluid seal because the hinge portion 258 grants the arm 256 and tip 254 a range of movement that includes the configuration of when just the end of the tip 254 engages the inner wall 252 (e.g. the point when the arm 256 is furthest from the inner wall 252) and when tip 254 is angled and has maximum engagement with the inner wall 252 (e.g. the point when the arm 256 is closest to the inner wall 252).

FIG. 26 shows an exploded view of the seal 250 and the floatable body member 231. Annular recess 270 is defined in the upper portion of the member 231 having an annular upper lip 272 and accommodates the y-seal 250. The recess 270 may have a variety of shapes. The width of the recess 270 is the same as the width of the seal 250, as shown in FIG. 23, and is held in place in a friction fit arrangement. FIG. 27 shows a side view of the seal 250, FIG. 28 shows a top view of the seal 250, FIG. 29 shows a bottom view of seal 250, and FIG. 30 shows a cross-sectional view of seal 250 taken along B-B in FIG. 27.

Referring to FIGS. 31, 32 and 33, there is shown the dispensing of filtered water from the lower portion 240 of cavity 208 via spout (or channel) 222 and pour lip 218. FIG. 31 illustrates pitcher 200 full of filtered water where the floatable body 230 is at the top of the cavity 208, as shown in FIG. 22. Pitcher 200 may be considered to be in a state of equilibrium while in the configuration shown in FIG. 22, meaning the force of gravity acting on floatable body 230 is balanced with the force due to the buoyancy of floatable body 230 (e.g. the force due to a pressure differential between the top and bottom of floatable body 230) and the friction of the y-seal 250 against the inner wall 252, and the atmospheric pressure exerted on the floatable body 230 is balanced with the atmospheric pressure exerted on the surface of the filtered water within channel 222. FIG. 31 illustrates pitcher 200 about to leave the state of equilibrium due to being tipped. In the context of the present description and the claims that follow, a pressure differential experienced by the floatable body refers to a difference in pressures, such as fluid (e.g. water, air, etc.) pressure, being exerted on the floatable body on either side of the seal 250 (e.g. above the seal vs. below the seal).

As the filtered water dispenses from the pitcher 200, the pressure exerted on the exposed surface of the filtered water within spout 222 is reduced as gravity pulls the water towards pour lip 218. See FIG. 32. The consequences of this reduction in pressure within spout (or channel) 222 may be discussed using Pascal's Law, since lower portion 240 of cavity 208 is essentially a confined system (e.g. a liquid seal is maintained between lower and upper portions of cavity 208, fluid movement through water filter 234 is slow enough compared to other equilibrium-seeking mechanisms as to not play a meaningful role, etc.), discounting channel 222 whose pressure we are holding as fixed, yet reduced. Pascal's Law states that a pressure change occurring anywhere in a confined incompressible fluid is transmitted throughout the fluid such that the same change occurs everywhere. In other words, the reduced fluid pressure at the exposed surface of the filtered water within channel (or spout) 222 is also experienced across the fluid interface with the bottom of the floatable body 230. The difference between this reduced pressure on one side of the floatable body 230 and the atmospheric pressure on the other side results in a non-zero net pressure being exerted on floatable body 230.

According to various embodiments, the cross sectional area of spout 222 is much smaller than the surface area of the bottom of floatable body 230, resulting in a hydraulic advantage (e.g. a small pressure differential in spout 222 can elicit a large force exerted on floatable body 230.) Advantageously, before the reduced fluid pressure within spout 222 can drop to the point where atmosphere is "gulped" up into the lower portion 240 of cavity 208 through the spout 222, the resulting force exerted on floatable body 230 is sufficient to pull it toward the bottom of the pitcher along with the shrinking supply of filtered water. More specifically, the lower friction arrangement of the y-seal 250 with the inner wall 252 allows the floatable body 230 to smoothly and quickly retract, or "auto-retract", allowing a significant pour rate, and also without any introduction of air bubbles or unfiltered water. As the floatable body 230 moves towards the bottom of the pitcher (e.g. away from the upper opening 314), the system is seeking to reach and maintain equilibrium once again. Equilibrium will be maintained when the pouring is halted or the filtered water runs out and the floatable body 230 reaches the bottom of the pitcher. See FIG. 33. The quick auto-retraction of floatable body 230 to the bottom of the pitcher facilitates quick and effortless refilling of the pitcher, without requiring the manual repositioning of the floatable body 230 to maximize space for unfiltered water.

By creating a pressure differential across the water filter 234 through the water in the pitcher 200 leaving the lower portion 240 of the pitcher cavity near the bottom of the pitcher cavity through the spout (or channel) 222 heading toward the pour lip 218 and the air within the upper portion 238 not able to pass through the filter fast enough to compensate, the float 230 is drawn toward the lower pressure of the system near the bottom of the pitcher 200. Note that in FIG. 32, the float 230 moves toward the bottom 206 of the pitcher 200 even when the pitcher 200 is turned to pour the water out and gravity would ordinarily cause the float 230 to slide toward the top of the pitcher 200. By creating a hydraulic lock between the float 230 and the water through creating lower pressure in the lower portion 240 of the pitcher cavity than in the upper portion 238 of the cavity 240, the float 230 moves to stay even with the water.

Controlling friction within a floatable filter pitcher system is not easy and is one of the main factors, along with the pressure differential, the filter media, the buoyancy of the float, the filter hole size and the weight of the float, that determines whether the system will work or not. Too much friction or too much weight in relation to the buoyancy of the float, and the water above the filter float will not be able to rise or will not rise fast enough to effectively filter the water. By trapping air below the float, buoyancy is increased. Yet, the liquid seal needs to maintain sufficient contact with the sides of the pitcher to act as a barrier to water passing from the upper portion to the lower portion other than through the filter. Without the pressure differential, the water would leave the spout 222 of the pitcher and the float would remain at the top of the pitcher and would not be ready to filter another portion of water added above it.

In particular embodiments, for a 10 cup pitcher, a rise time of 3-10 minutes is desirable and how quickly it rises will practically depend primarily upon what type of contaminants a user wants to remove from the water. For example, it has been found that for Chlorine removal only, a rise time of 50-200 seconds is practical. For other contaminants, such as heavy metals, benzene and atrazine, a rise time of 200-1200 seconds is practical.

Figure 34:
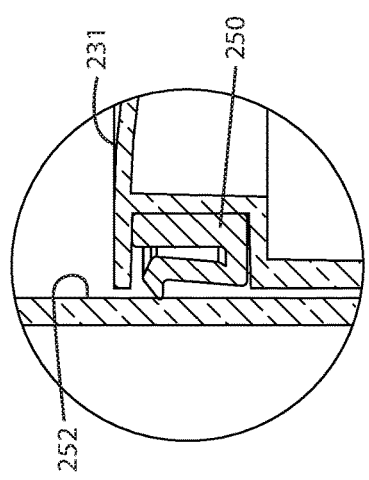
FIGS. 34-36 illustrate enlarged portions of FIGS. 31-33.
Figure 35:
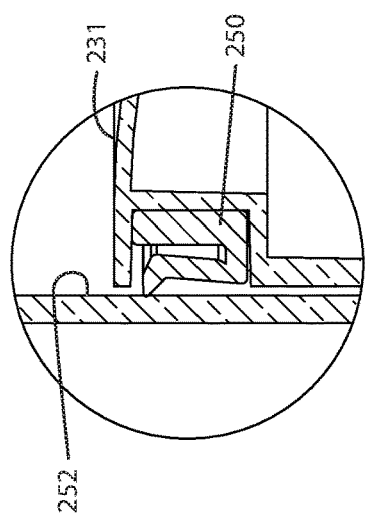
Figure 36:
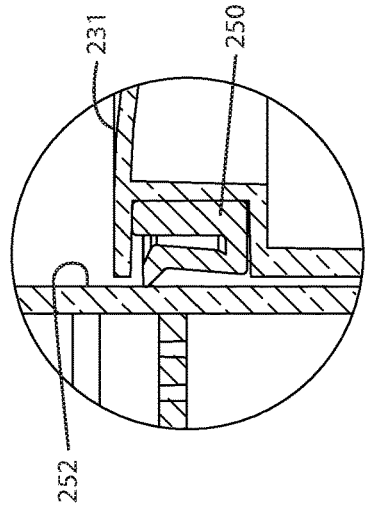

It is important that a liquid seal is maintained to separate unfiltered water from the filtered water in all positions, during filling and during dispensing, even when tipped which can cause uneven forces. The varying friction arrangement of y-seal 250 solves this design consideration. FIG. 34 shows an enlarged view D shown in FIG. 31, where the y-seal 250 with tip 254 distended slightly downward and creating a larger friction. As the pitcher 200 is tipped, the seal 250 switches to being distended slightly upward, as shown in FIG. 35 showing an enlarged view E shown in FIG. 32. When the filtered water is completely dispensed from the cavity 208, the seal 250 remains being distended slightly upward, as shown in FIG. 36 showing enlarged view F shown in FIG. 33.

Referring to FIG. 37, there is shown a perspective view of floatable body 230 comprising floatable body member 231 securingly receiving the water filter 234 and forming a liquid seal. Filter 234 can include any commercial filtration media. FIG. 38 illustrates a front side view of the floatable body 230, FIG. 39 illustrates a left side view of the floatable body 230, FIG. 40 illustrates a right side view of the floatable body 230, FIG. 41 illustrates a back side view of the floatable body 230, FIG. 42 illustrates a top view of the floatable body 230, and FIG. 43 illustrates a bottom view of the floatable body 230. FIG. 44 illustrates a cross-sectional view of floatable body 230 taken along lines C-C as shown in FIG. 38. As shown in FIG. 43, a bottom 280 of filter 234 has a plurality of openings 282 allowing filtered water to pass into the bottom portion 240 of the cavity 208. A bottom 284 of the floatable body member 231 has one more recesses, shown as four radially extending recesses 286 extending from the filter bottom 280 to a periphery of the floatable body member 231. The recesses 286 provide fluid paths from the openings 282 underneath the floatable body member 231 and along the pitcher bottom 206 to reduce suction when the floatable body member 231 rests on the pitcher bottom 206. In embodiments where the bottom side 284 of the floatable body is not included, as discussed previously, the channel 286 may be represented as a recess in the side wall of the floatable body member 23 at the edge of the floatable body member 231 as illustrated in FIGS. 38-41, the remaining surrounding edge providing a stand-off from the bottom of the bottom of the pitcher when the floatable body 230 is positioned at the bottom of the pitcher. The channel 286 would also be reflected in its extending through the sides of the bottom of the filter adapter opening 232. By including raised portions along the bottom edges of the floatable body 230, there is not any continuous surface that sits on the bottom of the pitcher to create a vacuum or a pressure-lock. The water can thereby flow more freely and the floatable member 230 can move more readily without the additional complications of nowhere for the initial water to flow when it seeps through the filter 234. In the embodiment of FIG. 43, this configuration would result in four stand-off legs around the bottom edge of the floatable body member 231 and four stand-off legs around the bottom edge of the filter adapter opening, each leg separated from the others by a gap or channel therebetween. Any number, one or more, of stand-off legs may be used, having at least one gap therebetween to reduce the likelihood of a vacuum or pressure lock being formed on the bottom of the floatable body 230 when immediately adjacent to the bottom of the pitcher.

As previously stated, filter 234 may include any commercial filtration media, according to various embodiments. The greater the level of filtration, the more difficult it may be to move liquid through the filter. It may be desirable to provide the end user with a uniform experience (e.g. time required to filter a new pitcher of water, etc.), independent of which type of filter is being used. In some embodiments, the size and/or number of openings 282 on the bottom of filter 234 may be modified commensurate with the flow rate per unit volume of the selected filtration media at the water pressures generated by the buoyancy of the floatable body 230, to make filtration time uniform for different filtration media.

Referring now to FIG. 45, there is shown an exploded view of the floatable body 230 including the filter 234 and the floatable body member 231. The filter adapter opening 232 is shown to have a twisted, contoured inner surface 290 corresponding to a twisted, contoured outer surface 292 of the filter 234. As illustrated in FIG. 46, the filter 234 is securely received in filter adapter opening 232 by inserting the filter and slightly twisting the filter, creating a liquid seal between the filter and the opening 232 once completely seated in the filter adapter opening 232. The filter 234 has a generally rectangular shape, but has smoothed and/or rounded corners as shown. The filter 234 has a plurality of radially extending intake openings 294 configured to draw unfiltered water from the upper portion 240 of cavity 208 into the filter for filtering by the filter media (not shown). Filtered water is dispensed from the filter 234 via openings 282 into the lower portion 240 of the cavity 208. The rotational arrow above the filter 234 indicates the direction of rotation for removing the filter 234 from the floatable body member 231.

Figure 47:
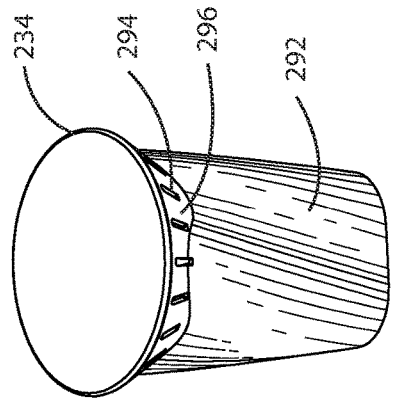
FIG. 47 illustrates a perspective view of the water filter.
Figure 52:
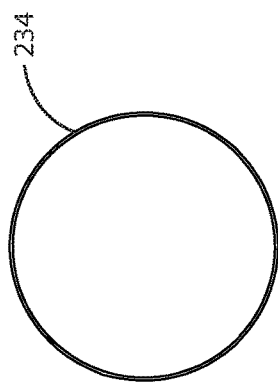
FIGS. 48-54 illustrate different views of the contoured water filter.
Figure 51:
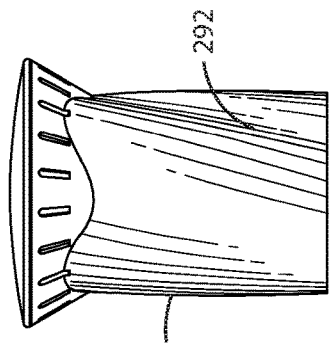
Figure 50:
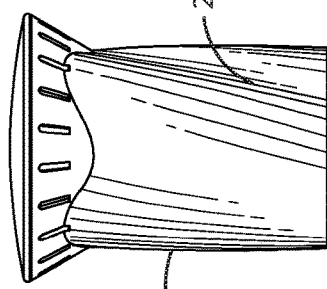
Figure 48:
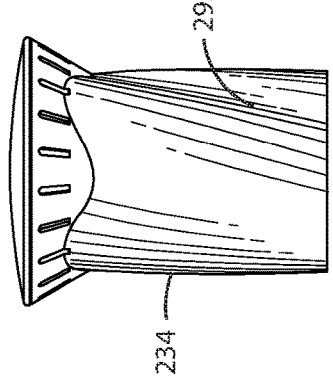
Figure 49:
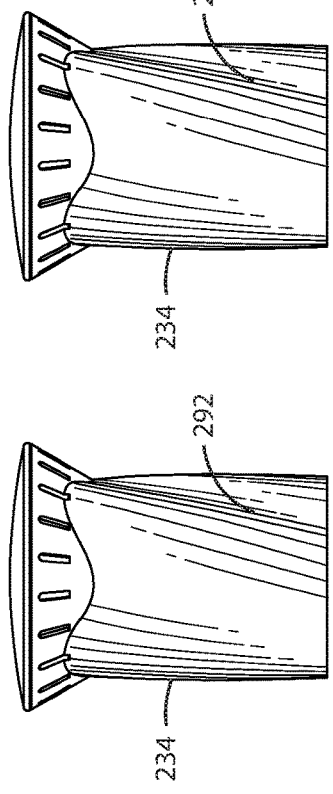
Figure 54:
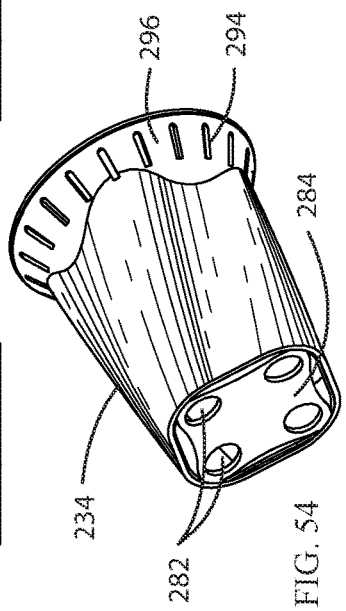
Figure 53:
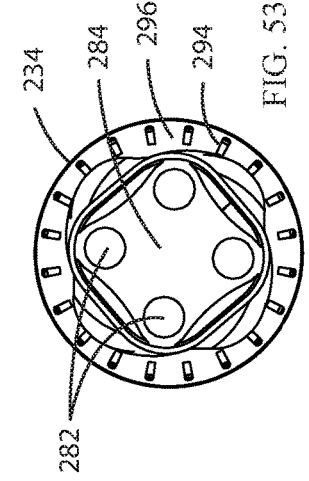

Referring to FIG. 47, there is shown a perspective view of filter 234. FIG. 48 shows a front view of filter 234, FIG. 49 shows a left side view of filter 234, FIG. 50 shows a right side view of filter 234, FIG. 51 shows a back side view of filter 234, FIG. 52 shows a top view of filter 234, FIG. 53 shows a bottom view of filter 234, and FIG. 54 shows a side perspective view of filter 234. As previously discussed with respect to FIG. 45, the filter 234 is generally rectangular but has curved edges that are twisted and contoured such that the filter 234 and which conform to the opposing twisted and contoured inner wall 290 of floatable body member 231. The outer surface of filter 234 is smooth about its circumference, such that the filter 234 twists about 20 degrees as it is received in the floatable body member 231. This contouring helps lock the filter 234 in place, and also provide a liquid seal between the filter 234 and the inner wall 290. The upper end of filter 234 is flared outwardly to form an annular surface 296. Surface 296 is angled, and conforms to an angled surface 298 formed about filter opening 232, as shown in FIG. 45.

Referring back to FIG. 44 in view of FIG. 20, the floatable body 230 has a height h that is about ⅓ the overall height H of cavity 208 (FIG. 20), where H=3 h. The volume of the gas-filled chamber 236 is engineered to take into account the weight of floatable body member 231, the seal 250, and the filter 234 such that the floatable body member 230 has a buoyancy configured to raise the floatable body member at the same rate that water is filtered through the filter. For instance, the buoyancy is configured such that the floatable body 230 rises from the bottom to the top of cavity 208 in about 8 minutes, which rise time matches the time to filter the volume of unfiltered water in the configuration shown. In other embodiments, the height h of the floatable body may be as low as ⅛ H, and may be as high as ½ H. The ratio of the floatable body 230 volume to the cavity 208 volume is about the same ratio which can vary between 1:2 and 1:8.

Figure 55:
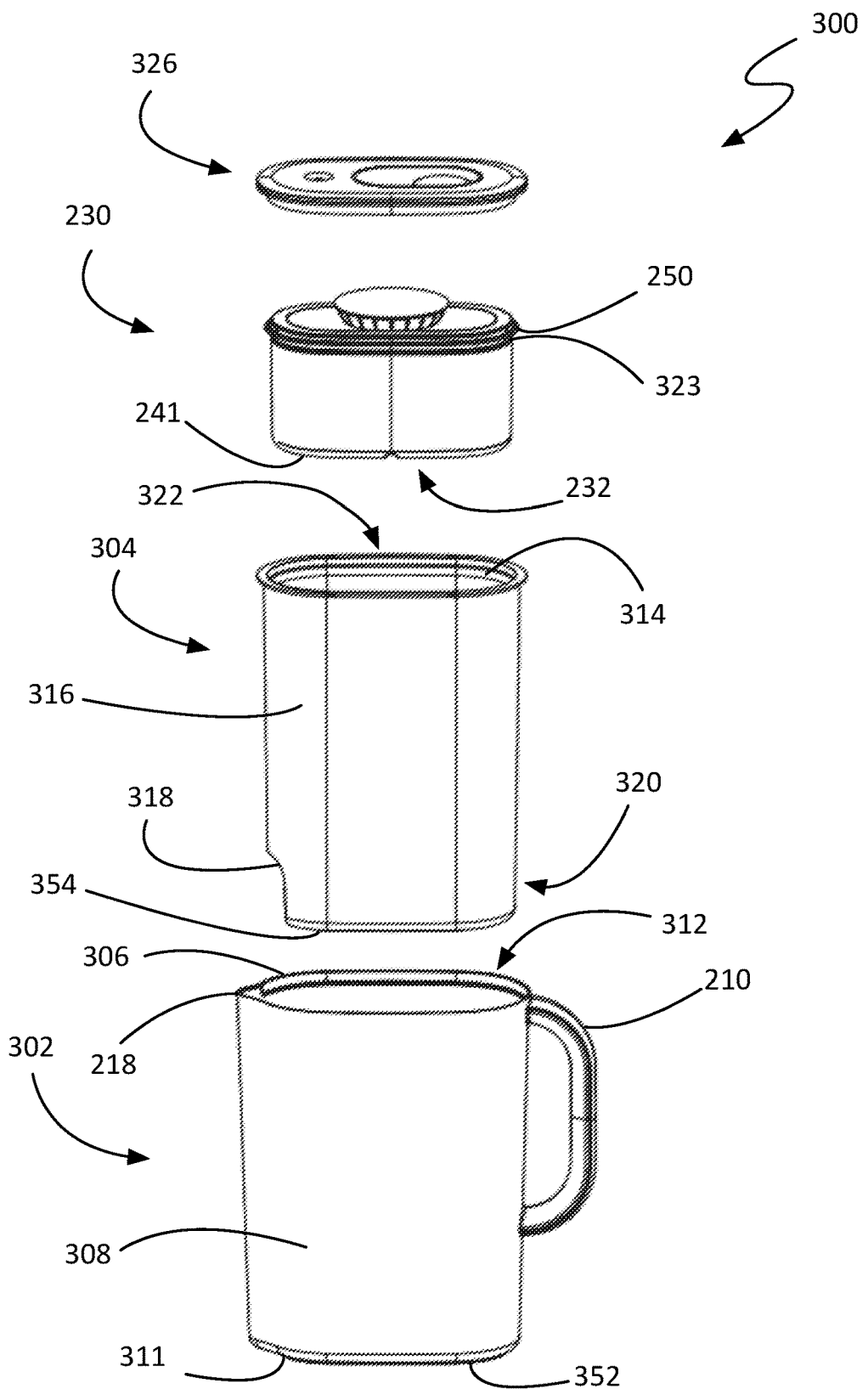
FIG. 55 is a perspective exploded view of a water pitcher having a floatable water filtering body and a sleeve.
Figure 57:
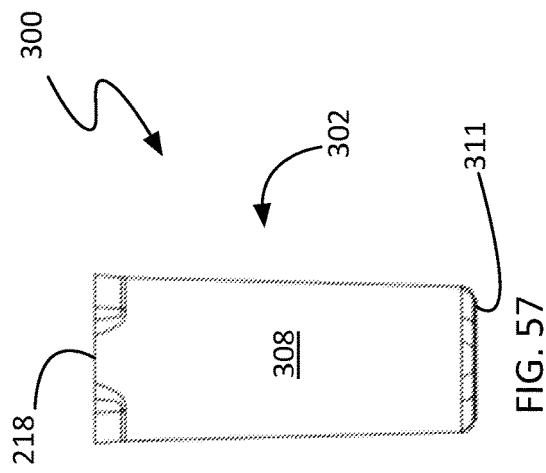
FIGS. 56-59 illustrate different views of the water pitcher of FIG. 55.
Figure 56:
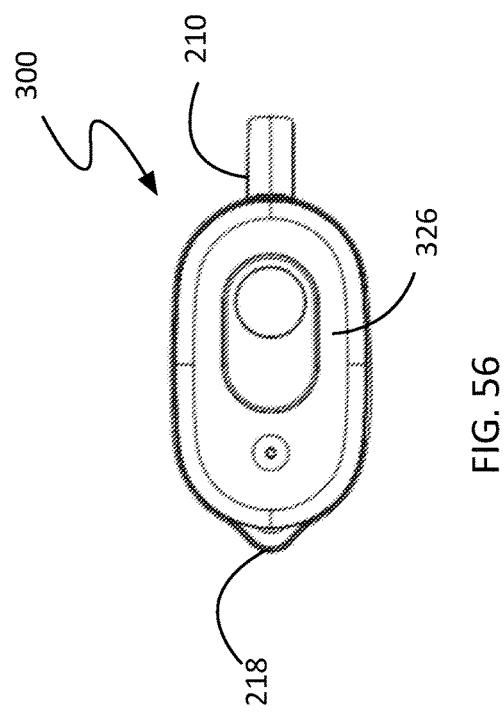
Figure 58:
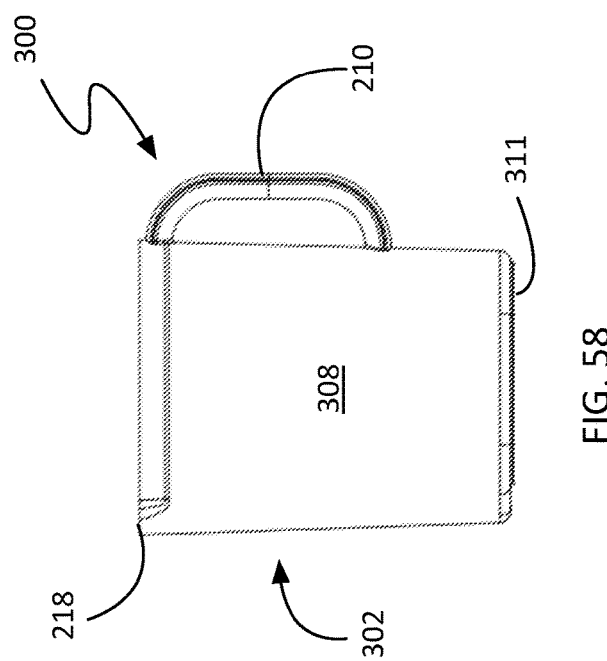

Referring now to FIG. 55, there is shown a perspective exploded view of another exemplary embodiment of a portable water filtration system generally shown as water pitcher 300. A top view of pitcher 300 is shown in FIG. 56, a front view in FIG. 57, a side view in FIG. 58, and an end view in FIG. 59.

The pitcher 300 is seen to comprise a container (e.g. a pitcher 302, a tumbler, etc.), a removable sleeve 304, a floatable body 230, and a removable lid 326. It should be noted that while the non-limiting example shown in FIGS. 55-59 differs from embodiments shown in other figures (e.g. extruded oval vs. cylindrical in shape, etc.), elements of pitcher 300 and the principles applied in its use and function may be interchanged with those of any other embodiments disclosed herein, and vice versa. Specifically, pitcher components, seals, floats, filters, materials, and the like may be interchanged between each of the various pitcher embodiments discussed elsewhere herein by matching shapes and sizes. One of ordinary skill in the art will understand that the principles applied for all of the pitcher embodiments are related so that the components and operations may be interchanged. Furthermore, aspects of previously discussed elements may be interchanged as well. As a specific example, the movable tapered tip 254 and arm 256 of FIGS. 23-25 may be employed in the seal of pitcher 300 in a manner that does not use the specific u-seal or y-seal embodiments illustrated (e.g. bridge 262 may be affixed to a horizontal surface of floatable body 230, or a standard o-ring seal may be used, etc.).

As shown in FIG. 55, pitcher (or container) 302 is formed by one or more pitcher sidewalls 308, an upper end 306 at the top, and a pitcher base 311 at the bottom, together forming a cavity or a first cavity 312, according to various embodiments. In some embodiments, the pitcher base 311 may have a planar bottom surface 352. The pitcher 302 further comprises a handle 210 and a pour lip 218 integral to the upper end 306 of the pitcher 302. In some embodiments, the upper end 306 of the pitcher 302 may refer to the opening of the pitcher 302. Although the non-limiting pitcher example illustrated in FIGS. 55-59 includes a pitcher 302 with an oval or race-track cross-section, it should be understood that other pitcher 302 shapes may alternatively be used provided a correspondingly shaped floatable body 230 and sleeve 304 is used. For example, it is specifically contemplated that instead of an oval cross-section of the cylindrical sidewall, an elliptical cross-section, an arch-shaped cross-section, or square or rectangular cross-section may be used.

The non-limiting example of a pitcher 300 shown in FIG. 55 further comprises a sleeve 304. According to various embodiments, the sleeve 304 interfaces with the seal 250 of the floatable body 230 to separate filtered water from unfiltered water. The use of a sleeve 304 inside a container (e.g. pitcher 302) is advantageous, in that it permits an efficient and consistent manufacturing process, and facilitates the incorporation of a floatable body 230 into a pitcher 300 having a more stylistic or irregular outer surface without compromising the fluid seal used at the interaction between the sleeve 304 and the float 232. As shown in FIG. 55, sleeve 304 may be removable, for cleaning or other convenience, while in other embodiments sleeve 304 may be permanently attached to pitcher 302.

As shown, sleeve 304 is formed by one or more sleeve sidewalls 316, an upper opening (or top open end) 314 at the top, and a lower end (or bottom open end) 320 at the bottom, together forming a second cavity 322, according to various embodiments. In some embodiments, the sleeve 304 may also have a planar or substantially planar bottom surface 354. In the context of the present description and the claims that follow, a lower end 320 of the sleeve 304 refers to a portion of the sleeve 304 opposite the upper opening 314. As shown, the sleeve 304 further comprises a lower opening 318 in the lower end 320, to allow filtered water to exit the sleeve 304 toward the pour lip 218. In some embodiments, including the non-limiting example shown in FIG. 55, the sleeve 304 may comprise a closed bottom, and the lower opening may be in one or more of the sleeve sidewalls 316. In other embodiments, the one or more sleeve sidewalls 316 may bend inward in the bottom open end (or lower end) 320 of the sleeve, forming a lip (see, for example, the stop lip 14 of FIGS. 3-4). In still other embodiments, the lower opening 318 may extend from a plane parallel to the upper opening (or top open end) 314 of the sleeve up part of one or more of the sleeve sidewalls 316. In particular embodiments, the lower opening 318 may be shaped and located such that its upper extremity is proximate the seal 250 of the floatable body 230 when the floatable body 230 is at the bottom of the sleeve 304. This may be advantageous, as it may facilitate the removal of air in the second cavity 322 trapped beneath the seal 250 during filling and filtering.

As shown, sleeve 304 is disposed inside the cavity (or first cavity) 312. To minimize the need to repeatedly add water to the pitcher 300 and maximize the amount of filtered water obtained with each fill, it is advantageous for the volume of the sleeve 304 to be similar to the volume of the pitcher 302, as the unfiltered water is only placed in the second cavity 322 (above the floatable body 230). In a particular embodiment, the sleeve 304 is roughly the same height as the pitcher 302, such that the upper opening 314 of the sleeve 304 is proximate the upper end 306 of the pitcher 302. In another embodiment, the second cavity 322 fills a majority of the first cavity 312. In still another embodiment, the volume of the second cavity 322 may be at least 70%, 85%, or more, of the volume of the cavity (or first cavity) 312.

According to various embodiments, the sleeve 304 comprises sleeve sidewalls 316 that are substantially vertical. In the context of the present description and the claims that follow, substantially vertical means within 2° of vertical. The use of a y-seal 250 on the floatable body 230 may be advantageous in embodiments where the sleeve sidewalls 316 are not absolutely vertical, since the hinge portion 258 of the seal 250 allows the tip 254 to move side to side without compromising the fluid seal, as previously discussed. In particular embodiments, the sleeve comprises a top portion with a wall slope within 1° of vertical, a middle portion with a wall slope within 0.5° of vertical and a lower portion with a wall slope within 1° of vertical. The top portion is adjacent the top opening of the sleeve to the middle portion, the middle portion extends for a majority of the sleeve height, and the bottom portion begins below the middle portion at a point below the height of the floatable body 230 so that the floatable body seal 250 remains in contact with the middle portion when it is in its lowest operating position in the sleeve.

In some embodiments, the sleeve 304 may be coupled to the pitcher 302 near the upper opening (or top open end) 314, to prevent the sleeve 304 from rising up as water is filtered. In one embodiment, the sleeve 304 and the pitcher 302 may be coupled near the upper opening 314 by friction, an outer surface of the sleeve 304 being in direct contact with an inner surface of the pitcher 302. In another embodiment, the two may be coupled through a material or gasket. In yet another embodiment, the lid 326 may directly couple with the upper end 306 of the pitcher 302 and the top open end 314 of the sleeve 304, holding both in place. In other embodiments, the sleeve 304 and pitcher 302 may be coupled near the pitcher base 311, or elsewhere, to prevent the sleeve 304 from moving up and down with respect to the pitcher 302.

Pitcher 300 also includes a floatable body 230, having a seal 250 extending outward from an outer surface 323 of the floatable body 230. In some embodiments, the floatable body 230 may also have a planar, or substantially planar, bottom surface 241, which may be maintained parallel, or substantially parallel (e.g. within 2 degrees, etc.), to the planar bottom surface 352 of the pitcher and/or the planar bottom surface 354 of the sleeve as the floatable body 230 moves up and down, according to some embodiments. Similar to previously discussed embodiments, the seal 250 is configured to engage with the one or more sleeve sidewalls 316 such that water is restricted from passing between the floatable body 230 and the sleeve 304 and a pressure differential sufficient to move the floatable body 230 up and down within the sleeve 304 may be created and maintained as water moves up and down in the channel. Any of the other floatable body embodiments disclosed herein may be adapted for use with a sleeve 304. The floatable body 230 is configured to maintain its relative orientation with respect to the sleeve 304, independent of the orientation of the pitcher 300. As previously discussed, this is accomplished through the seal 250, as well as the thickness of the floatable body 230 being such that it cannot tip far enough for the seal 250 to disengage, let alone get stuck or flip over entirely. The height of the floatable body 230 (or, more specifically, the volume of trapped gas within the floatable body) may vary, depending upon the material, shape, and resulting frictions (e.g. friction while moving upward, friction while moving downward) associated with accompanying seal 250. For example, a seal having lower friction may be used with a thinner floatable body 230 than seal having higher friction, which would need to be balanced with the larger buoyant force of a thicker floatable body 230.

As previously discussed, floatable body 230 further comprises a filter opening 232 surrounded by the floatable body 230 and configured to receive a filter 234. In the non-limiting example shown in FIGS. 55-59, the filter opening 232 is accessible from the bottom of the floatable body 230, while the top of the floatable body 230 comprises a series of holes to allow water to enter a filter 234 installed in the filter opening 232.

Figure 62:
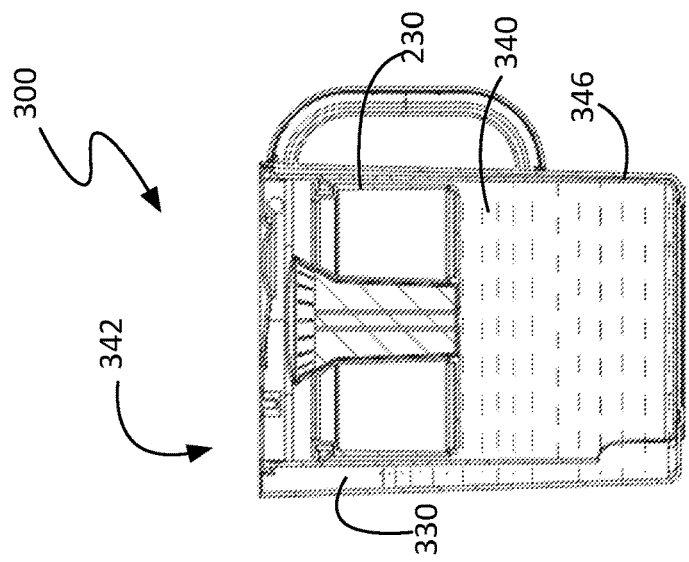
FIGS. 60-62 illustrate cross-sectional views of the water pitcher of FIG. 55 with the floatable water filtering body in different positions.
Figure 61:
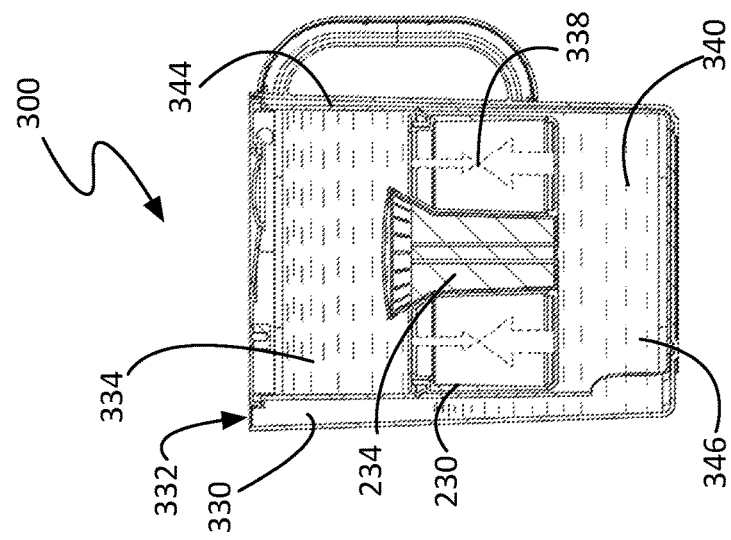
Figure 60:
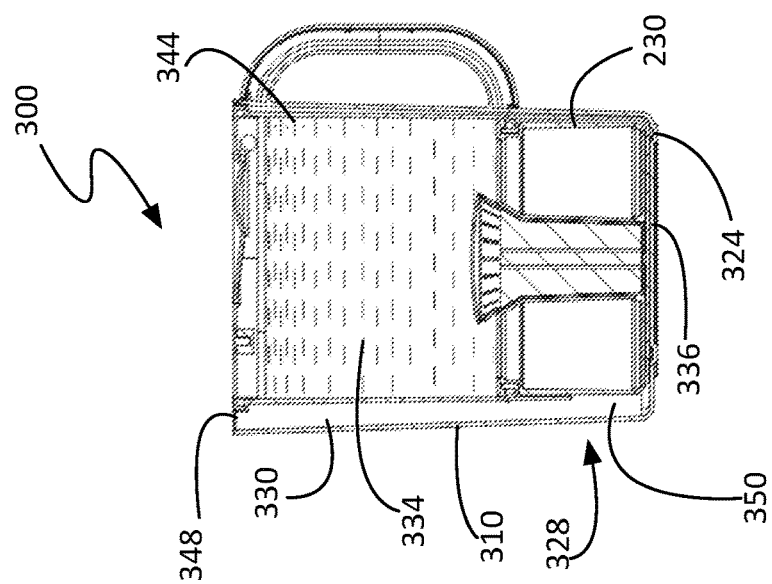

The pitcher 300 has a pour lip 218 proximate the upper end 306. The pour lip 218 is configured to dispense filtered water via a spout (or channel) 330 formed by a void 332 between the pitcher (or container) sidewalls 308 (e.g. outer wall 310) and the sleeve sidewalls 316, as shown in FIGS. 60-62. The spout 330 extends between an inlet opening 350 adjacent the base 311 and an exit opening 348 adjacent the upper end 306. The inlet opening 350 is in fluid communication with the lower end 320 of the sleeve 304, and is configured to receive water from the second cavity 322, as shown. In some embodiments, the pitcher 302 and the sleeve 304 may be mated or in some way sealed along the perimeter of the spout 330 as well as the lower opening 318 of the sleeve 304, such that the filtered water between the pitcher sidewalls 308 and the sleeve sidewalls 306 is confined to the spout 330. In other embodiments, the filtered water may be allowed to enter whatever space (albeit small) there is between the pitcher sidewalls 308 and the sleeve sidewalls 306, and the pitcher 302 and the sleeve 304 may be coupled such that filtered water only exits the pitcher 300 from the pour lip 218 when tipped.

Figure 59:
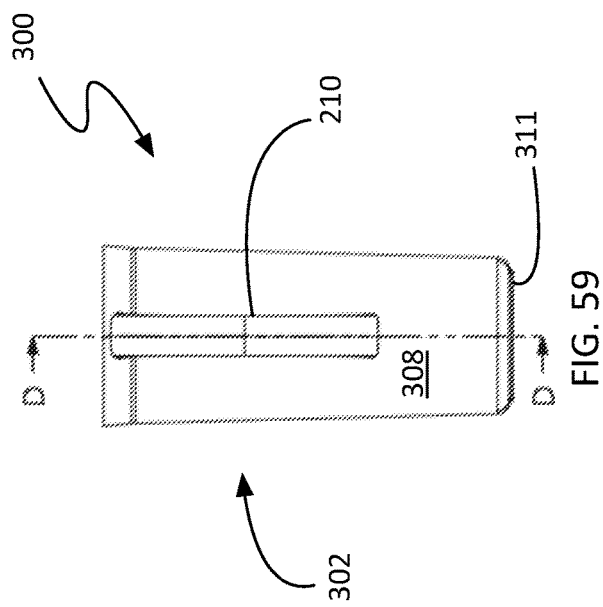

Referring now to FIGS. 60, 61 and 62, there are shown cross sectional views of the pitcher 300 taken along a cross section D-D as shown in FIG. 59 for various levels of filtered water within the pitcher 300. FIG. 60 shows a floatable body 230 comprising a centrally located filter opening 232 receiving an interchangeable water filter 234. The floatable body 230 resides in a first (or lowered) position 328, which is the lowest point of the second cavity 322 accessible to the floatable body 230. According to various embodiments, the floatable body 230 is in the first (or lowered) position 328 when there is no water in the second cavity 322, and when unfiltered water 334 is initially poured into the pitcher 300.

As mentioned, the sleeve 304 may be removable. In such embodiments, various methods may be employed to constrain movement of the sleeve 304 with respect to the pitcher 302, which may otherwise float within the pitcher 302 or wobble. In some embodiments, the lower end 320 of the sleeve 304 may be at least partially secured with respect to the pitcher 302 through the use of a protrusion 324. As shown in the non-limiting example of FIG. 60, the lower end 320 of the sleeve 304 has a protrusion 324 extending outward, in the shape of an oval with one end inverted (e.g. following the shape of the bottom of the first cavity 312 of the pitcher 302). Furthermore, the embodiment of the pitcher 302 shown in FIG. 60 comprises a indentation in the interior surface of the pitcher base 311 that mates with the protrusion 324 of the sleeve 304, inhibiting side-to-side movement of the sleeve 304 with respect to the pitcher 302. In some embodiments, the pitcher 302 may comprise one or more protrusions 324 that mate with the sleeve 304 to restrict movement. In other embodiments, the lower end 320 of the sleeve (or another part of the sleeve 304) may comprise one or more protrusions 324 that mate with the pitcher 302 to restrict movement. In some embodiments, the sleeve 304 may have a base, which may be shaped to mate with a protrusion 324 of the pitcher base 311. In other embodiments, the lower end 320 of the sleeve 304 may be at least partially open. In such embodiments, the pitcher base 311 may comprise a protrusion that mates with the edge of at least part of the sleeve sidewalls 316 in the lower end 320.

As seen in the non-limiting example shown in FIG. 60, a duct 336 exists between the bottom of the floatable body 230 and surface on which it rests while in the first (or lowered) position 328. As previously discussed, in some embodiments the floatable body 230 may rest on a surface (e.g. pitcher base 311, a sleeve base in the lower end 320, etc.) when in the first (or lowered) position 328. In such embodiments, surface tension may prevent the separation of the floatable body 230 from the surface, preventing or inhibiting the filtration of water. As a solution to this problem, particular embodiments comprise a duct 336 between the bottom of the floatable body 230 and the surface, such that the upper portion 344 of the second cavity 322 remains in fluid communication with the spout 330 through the water filter 234 while the floatable body 230 is in the first (or lowered) position 328. Alternatively, a channel or duct may be formed on the bottom surface of the floatable body 230 (see, for example, channel 286 in FIGS. 39-43).

In some embodiments, the duct 336 may be formed by a standoff placed between the surface and the floatable body 230 (the standoff may be part of either, or both). In other embodiments, the bottom surface of the floatable body 230 and/or the surface on which it rests while in the first (or lowered) position 328 may be mismatched such that the duct 336 exists. It should be noted that in some embodiments, the floatable body 230 may be held above a surface by a structure (e.g. narrowing of the sleeve, a lip in the lower end 320, etc.) while in the first (or lowered) position 328, essentially creating a duct 336 the size of the bottom of the floatable body 230.

FIG. 61 illustrates the floatable body 230 at a midsection of second cavity 322 as gravity causes water to filter from an upper portion 344 of the second cavity 322 holding unfiltered water 334 to a lower portion 346 of the second cavity 322 holding filtered water 340. The floatable body 230 rises in the second cavity 322 as the amount of filtered water 340 in lower portion 346 increases and the amount of unfiltered water 334 in the upper portion 344 decreases. As previously discussed, this motion may be attributed to a pressure differential 338.

FIG. 62 illustrates the floatable body 230 in a second (or raised) position 342, which is the highest point of the second cavity 322 accessible to the floatable body 230. According to various embodiments, the floatable body 230 is in the second (or raised) position 342 when unfiltered water 334 in the upper portion 344 has completely filtered into the lower portion 346. FIGS. 60-62 illustrate the water level of filtered water 340 in the spout 330 during the filtering process, but for clarity do not show any filtered water 340 between the pitcher sidewalls 308 and sleeve sidewalls 316 outside of the spout 330.

Though this disclosure has been described with respect to exemplary embodiments, many variations and modifications will become apparent to those skilled in the art upon reading the present application. The disclosure is therefore that the appended claims be interpreted as broadly as possible in view of the prior art to include all such variations and modifications. For instance, the container can be sized as a handheld device having an upper pour lip but without a handle, characterized as a tumbler. The container can also be configured with a lower dispensing port disposed through the sidewall, such as a spigot, proximate the container bottom to allow the selective dispensing of filtered water. In another embodiment, the seal 250 may be coupled to the floatable body member in an inverted position, wherein the friction arrangement is reversed such that the friction is lower as the floatable body rises and higher when the floatable body is advanced toward the cavity bottom.

In another exemplary embodiment, the floatable body 230 can be comprised of a singular integral body having a body opening and a media filter defined therein, where the filter 234 is not used. In addition, the floatable body can be configured to have an integrated central body chamber in place of the filter opening configured to receive filter media wrapped in a fluid porous membrane, such as like a tea-bag filter. A pivoting lid covers the body opening, and can be opened to receive the modular filter media and then closed. The lid is configured to have openings to allow water to filter through the media filter, and the bottom of the body chamber also has openings to allow the filtered water to pass to the filtered water cavity of the pitcher. This embodiment allows a disposable modular filter media to be used without a plastic housing, thereby creating a green media filter solution.

Various non-limiting aspects of embodiments of a water filter system may comprise one or more of the following materials. Any of the floatable seals described and contemplated herein may comprise polypropylene (PP). Various embodiments of the floatable seals described and contemplated herein may comprise a float overmold comprising thermoplastic elastomer (TPE) and/or GLS Versaflex™ CL. Any of the containers, pitchers, cups and the like described and contemplated herein may comprise polycarbonate (PC) and/or clear acrylic. Various embodiments of the containers, pitchers, cups and the like described and contemplated herein may comprise a pitcher overmold comprising thermoplastic elastomer (TPE) and/or GLS Versaflex™ OM. Any of the pitcher lids described and contemplated herein may comprise PC and/or clear acrylic. Any of the filter sleeves contemplated and described herein may comprise PC and/or clear acrylic. Any of the sleeve lids, flaps, or other lids contemplated and described herein may comprise PC and/or acrylonitrile butadiene styrene. Various embodiments may further comprise stainless steel spring to bias the flap. Various embodiments may further comprise a PP filter top and filter bottom. Various embodiments of a water filter system may further comprise seal between the sleeve lid and the sleeve. This seal may comprise a silicone or any other O-ring known the art.

It will be understood that while the containers shown and referenced in most of the figures of this document comprises a pitcher, it is contemplated aspects of the water filter systems described herein may be applied to other containers without departing from the scope of this disclosure. For example, the water filter systems described herein may be adapted to drink coolers or dispensers, cups, dog bowls, and coffee makers. Aspects of this described water filter systems may also be manufactured according to any methods known in the art. In some non-limiting embodiments, one or more of the floatable seal, the container, the filter sleeve, and/or lid are injection molded and/or blow molded.

One or more embodiments of the drinking water filter systems contemplated herein may further comprise a flavoring cartridge. The flavoring cartridge may be couple to one of the floatable seals described herein proximate the filter opening. More particularly, the flavoring cartridge may removably couple to the floatable seal near the base of the floatable seal. In still other embodiments, the flavoring cartridge is configured for use in place of the filter, and therefore sized to mount within the filter opening of the respective floatable seal. According to some aspects, the flavoring cartridge may be utilized with or without the filter, and is configured to add flavoring to the water as it passes through the flavoring cartridge. Flavors may include but are not limited to coffee flavors, tea flavors, fruit flavors, vitamin additives, electrolyte additives, energy additives, sweeteners, and/or any other drink additive known in the art.

In other embodiments of a drinking water filter system, the drinking water filter system comprises any of the containers and filters described throughout this document. In one or more embodiments, the seal may be configured to comprise a weighted seal, as opposed to a floating seal, that is configured to sink in water rather than float in water. In such an embodiment, the weighted seal may be configured similar to the floating seal described above, including but not limited to a filter opening, rings, and/or annular arms. The weighted seal, however, comprises a weighted annular body, with or without an air-filled chamber. The weighted annular body is weighted such that the seal sinks when placed on water. In other embodiments, the weighted seal comprises a plurality of weighted bodies comprising any shaped that allows the seal to sink when placed in water. The annular weighted body or plurality of weighted bodies may be placed within a chamber within the seal, or may form the body of the seal and are weighted such that when the seal is placed on water in the container, the seal sinks as unfiltered water passes through the filter from the area below the filter to the area above the filter. The weighted bodies may comprise varies metals, rubbers, or plastics.

In operation, embodiments of the weighted seal filter water as the weighted seal sinks in a container of unfiltered water. A weighted seal is placed on top of water in the container, the filter typically being coupled to the seal previous to the seal being placed on the water in the container. As the weighted seal sinks in the in the water, the unfiltered water passes from below the filter through the filter to the area above the filter. The rings and/or annular arms of the seal restrict water from passing between the seal and the walls of the container, as described in relation to other seal embodiments.

In still other embodiments of a drinking water filter system, the drinking water filter system comprises any of the containers and filters described elsewhere in this document. Embodiments of the seal of these embodiments, however, differ from the seals described in this document. In one or more embodiments, the seal comprises a handle coupled to the seal. In such an embodiment, the handled seal may be configured similar to the floating seal or weighted seal described above, including but not limited to a filter opening, rings, and/or annular arms. The handled seal may further comprise the weighted bodies or gas-filled chambers of previous embodiments or, alternatively, may lack comprise only a plate extending between the filter opening and the annular arms and/or rings. The handle is positioned on the seal such that when the seal is placed on water in the container, unfiltered water passes through the filter from the area below the seal to the area above the seal, or vice versa depending upon which direction the force is applied, as a user holding the handle applies a force to the seal.

In operation, embodiments of the handled seal filter water as the handled seal sinks in a container of unfiltered water. A handled seal is placed on top of water in the container, the filter typically being coupled to the seal previous to the seal being placed on the water in the container. Using the handle, a user then presses the seal downward. As the handled seal sinks in the in the water, the unfiltered water passes from below the filter through the filter to the area above the filter. The rings and/or annular arms of the seal restrict water from passing between the seal and the walls of the container, as described in relation to other seal embodiments. According to some aspects, the floatable seals contemplated herein are configured such that the filter 40 does not rest in the filtered water held in the container. Specifically, the floatable seals may comprise lips or other configurations that hold the base of the filter above the bottom of the respective floatable seal.

It will be understood that implementations are not limited to the specific components disclosed herein, as virtually any components consistent with the intended operation of a method and/or system implementation for a water filter system may be utilized. Accordingly, for example, although particular filters, containers, and seals may be disclosed, such components may comprise any shape, size, style, type, model, version, class, grade, measurement, concentration, material, weight, quantity, and/or the like consistent with the intended operation of a method and/or system implementation for a water filter system may be used.

What is claimed is:

1. A portable water pitcher comprising:
   a floatable body adapted to couple a replaceable water filter to the floatable body, and adapted to fit within a pitcher sidewall continuously surrounding and defining a pitcher cavity having an upper end and a base opposite the upper end;
   a seal circumferentially attached to the floatable body and extending from the floatable body outward of an outer surface of the floatable body, the seal configured to engage the pitcher sidewall; and
   a spout coupled to the pitcher adjacent the base of the cavity and defining a water inlet opening, the inlet opening of the spout in fluid communication with the pitcher cavity and adapted to receive water from the pitcher cavity;
   wherein the floatable body is disposed in the pitcher cavity with the seal engaging the pitcher sidewall to restrict water from passing between the seal and the pitcher sidewall as the floatable body moves from a raised position adjacent the top end of the pitcher cavity to a lowered position adjacent the bottom open end of the pitcher cavity; and
   wherein as a function of water dispensing through the spout, the floatable body auto-retracts towards the base while maintaining the engagement of the seal with the pitcher sidewall and an orientation of the floatable body in relation to the base.

2. The portable water pitcher of claim 1, wherein the auto-retraction of the floatable body is in reaction to a pressure differential created between air above the floatable body in the pitcher cavity and water below the floatable body in the pitcher cavity.

3. The portable water pitcher of claim 1, wherein the auto-retraction of the floatable body is in a direction away from the exit opening of the spout.

4. The portable water pitcher of claim 3, wherein when the pitcher is tipped to pour water from the spout, the base of the pitcher cavity is located above the exit opening of the spout when the floatable body auto-retracts away from the upper opening towards the base.

5. The portable water pitcher of claim 4, wherein the seal is located above the base of the pitcher cavity after the floatable body has been auto-retracted to the base.

6. The portable water pitcher of claim 5, wherein the floatable body has a planar bottom surface and the base of the pitcher cavity has a planar surface, wherein when the pitcher is tipped to pour water from the spout, the planar surfaces are located parallel to one another and remain parallel as the floatable body auto-retracts towards the base.

7. The portable water pitcher of claim 1, further comprising a removable lid coupled to the upper end of the pitcher cavity.

8. The portable water pitcher of claim 1, wherein the floatable body having a volume within the floatable body and the second cavity having a volume within the second cavity, wherein the ratio of the floatable body volume to the second cavity volume being within the range of ⅛ to ½.

9. The portable water pitcher of claim 1, wherein the floatable body has a planar surface and the base has a planar bottom surface oriented parallel to the planar surface of the floatable body, and wherein the planar surface of the floatable body and the parallel bottom surface remain parallel despite the planar bottom surface being tipped from a horizontal to a vertical orientation as water is dispensing from the pitcher and the floatable body auto-retracts toward the planar bottom surface.

10. A portable water pitcher comprising:
    a floatable body adapted to couple a replaceable water filter to the floatable body and adapted to fit within a pitcher sidewall surrounding and defining a pitcher cavity, the pitcher having an upper end, a base opposite the upper end;
    a seal coupled to and about the floatable body and extending outward of an outer surface of the floatable body, the seal configured to engage the pitcher sidewall; and
    a channel coupled to the pitcher and extending from adjacent the base of the pitcher to adjacent the upper end of the pitcher, the channel in fluid communication with the pitcher cavity and adapted to receive water from the pitcher cavity adjacent the base of the pitcher and dispense water from the channel adjacent the upper end of the pitcher;
    wherein when the floatable body is disposed in the pitcher cavity with the seal engaging the sidewall of the cavity, the seal is configured to restrict water from passing between the seal and the pitcher sidewall as the floatable body moves between a first position and a second position within the pitcher cavity; and
    wherein when water is poured from the channel of the pitcher, as a result of water dispensing through the channel, the floatable body auto-retracts away from the upper end towards the base while maintaining the engagement of the seal with the pitcher sidewall.

11. The portable water pitcher of claim 9, wherein the auto-retraction of the floatable body is in a direction away from the upper end of the pitcher.

12. The portable water pitcher of claim 11, wherein when the pitcher is tipped to pour water from the channel, the base of the pitcher is located above the channel when the floatable body auto-retracts away from the lid towards the base.

13. The portable water pitcher of claim 12, the pitcher sidewall further comprising an opening in fluid communication with the channel, wherein the seal is located above the opening of the pitcher sidewall after the floatable body has been retracted to the base.

14. The portable water pitcher of claim 13, wherein the floatable body has a planar bottom surface and the base has a planar bottom surface, the planar surfaces located parallel to one another and remaining parallel as the floatable body auto-retracts toward the base when the pitcher is tipped to pour water from the channel.

15. The portable water pitcher of claim 13, wherein the floatable body further comprises at least one contact point on a surface of the floatable body configured to contact the pitcher sidewall as the floatable body moves that is vertically spaced from the seal by more than half a distance between a top surface of the floatable body and a bottom surface of the floatable body.

16. The portable water pitcher of claim 10, further comprising a lid coupled to the upper end.

17. The portable water pitcher of claim 10, wherein the auto-retraction of the floatable body is in reaction to a pressure differential created between air above the floatable body in the pitcher cavity and water below the floatable body in the pitcher cavity.

18. The portable water pitcher of claim 10, wherein the floatable body has a planar surface and the base has a planar bottom surface oriented parallel to the planar surface of the floatable body, and wherein the planar surface of the floatable body and the parallel bottom surface remain parallel despite the planar bottom surface being tipped from a horizontal to a vertical orientation as water is dispensing from the pitcher and the floatable body auto-retracts toward the planar bottom surface.

19. A method of filtering water, comprising:
  providing a manually portable water container having a handle, an upper end, one or more pitcher sidewalls, a pitcher base opposite the upper end, a lower opening in the one or more pitcher sidewalls proximate the pitcher base, together defining a pitcher cavity;
  securing an interchangeable water filter to a floatable body and coupling a seal to the floatable body, the seal extending radially outward of an outer surface of the floatable body;
  disposing the floatable body and water filter within the pitcher cavity such that the seal is engaged with the one or more pitcher sidewalls and restricts water from passing between the seal and the one or more pitcher sidewalls while the floatable body remains moveable within the pitcher cavity between a first position proximate the pitcher base to a second position proximate the upper end;
  filling a portion of the pitcher cavity above the floatable body with unfiltered water deposited through a pitcher opening proximate the upper end;
  dispensing filtered water by dispensing the filtered water from the pitcher cavity below the floatable body through the lower opening to a channel extending from the pitcher cavity proximate the pitcher base;
  refilling the portion of the pitcher cavity above the floatable body with unfiltered water after the filtered water has been dispensed and the floatable body has auto-retracted to the first position in response to the dispensing of the filtered water;
  wherein filtered water is deposited into the pitcher cavity below the floatable body from the unfiltered water above the floatable body after passing through the water filter as the floatable body moves within the pitcher cavity toward the second position;
  wherein the floatable body auto-retracts toward the first position, while maintaining engagement with the one or more sidewalls, in response to a pressure differential within the pitcher cavity created by dispensing filtered water from the pitcher cavity through the channel, wherein the auto-retraction toward the first position is a result of the dispensing of filtered water;
  wherein the floatable body comprises a planar surface and the base of the pitcher cavity has a planar surface parallel to the planar surface of the floatable body; and
  wherein the planar surface of the floatable body and the planar surface of the base remain in parallel despite the pitcher being tipped from a horizontal to a vertical orientation as water is dispensing from the pitcher and the floatable body auto-retracts toward the first position.

20. The method of claim 19, further comprising coupling a removable lid to the upper end and the upper opening.

* * * * *